(12) United States Patent
Uno et al.

(10) Patent No.: US 11,372,576 B2
(45) Date of Patent: Jun. 28, 2022

(54) DATA PROCESSING APPARATUS, NON-TRANSITORY COMPUTER-READABLE STORAGE MEDIUM, AND DATA PROCESSING METHOD

(71) Applicant: FUJITSU LIMITED, Kawasaki (JP)

(72) Inventors: Tomohiro Uno, Nagoya (JP); Tomonori Furuta, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/095,788

(22) Filed: Nov. 12, 2020

(65) Prior Publication Data
US 2021/0173581 A1 Jun. 10, 2021

(30) Foreign Application Priority Data
Dec. 10, 2019 (JP) .............................. JP2019-222855

(51) Int. Cl.
*G06F 3/06* (2006.01)
*G06F 16/90* (2019.01)
(Continued)

(52) U.S. Cl.
CPC .......... *G06F 3/0652* (2013.01); *G06F 3/0604* (2013.01); *G06F 3/067* (2013.01); *G06F 16/24556* (2019.01); *G06F 16/9027* (2019.01)

(58) Field of Classification Search
CPC ...... G06F 3/0652; G06F 3/0604; G06F 3/067; G06F 16/9027; G06F 16/24556
See application file for complete search history.

(56) References Cited

U.S. PATENT DOCUMENTS 8,290,972 B1 10/2012 Deshmukh et al.
2011/0225182 A1 9/2011 Tsuchiya et al.
(Continued)

FOREIGN PATENT DOCUMENTS

EP 3495964 A1 6/2019
JP 2011-186954 A 9/2011
(Continued)

OTHER PUBLICATIONS

Guo, Deke et al., "False Negative Problem of Counting Bloom Filter", IEEE Transaction,S on Knowledge and Data Engineering, IEEE Service Centre, vol. 22, No. 5, pp. 651-664, May 1, 2010, X11299527.
(Continued)

*Primary Examiner* — Masud K Khan
(74) *Attorney, Agent, or Firm* — Fujitsu Patent Center

(57) ABSTRACT

A data processing apparatus includes a memory configured to store a bit array including a first Bloom filter associating with a first subset containing a data element matching a first classification condition and a second Bloom filter associating with a second subset containing a data element matching a second classification condition, and a processor configured to, when a first data element to be a search target is inputted, determine whether the same data element as the first data element is present in the first subset by using the first Bloom filter, determine whether the same data element as the first data element is present in the second data subset by using the second Bloom filter, and when all the data elements contained in the first subset are deleted, delete the first Bloom filter from the bit array.

9 Claims, 25 Drawing Sheets

(51) Int. Cl.
  *G06F 16/24* (2019.01)
  *G06F 16/2455* (2019.01)
  *G06F 16/901* (2019.01)

(56) References Cited

U.S. PATENT DOCUMENTS

| | | | |
|---|---|---|---|
| 2018/0005126 A1* | 1/2018 | Yamagami | G06N 20/00 |
| 2018/0225321 A1* | 8/2018 | Boles | G06F 16/9027 |
| 2019/0155927 A1* | 5/2019 | Nagao | G06F 16/9535 |
| 2019/0220190 A1* | 7/2019 | He | G06F 3/0655 |
| 2021/0149580 A1* | 5/2021 | Fessel | G06F 3/0673 |

FOREIGN PATENT DOCUMENTS

| | | |
|---|---|---|
| JP | 2018-526737 A | 9/2018 |
| JP | 2019-095986 A | 6/2019 |
| WO | 2017/044867 A1 | 3/2017 |

OTHER PUBLICATIONS

Crainiceanu, Adina et al., "Bloofi: Multidimensional Bloom filters", Information Systems, Elsevier, vol. 54, pp. 311-324, Jan. 17, 2015, XP29263532.

Extended European Search Report dated May 3, 2021 for corresponding European U.S. Appl. No. 20206928.2, 7 pages.

* cited by examiner

FIG. 5

STORAGE UNIT (110)

Table 112:

| FILE NUMBER | FILE NUMBER | SIZE | CHUNK NUMBER |
|---|---|---|---|
| f1 | o1 | s1 | ck1 |
| f1 | o2 | s2 | ck2 |
| f2 | o11 | s11 | ck3 |
| f2 | o12 | s12 | ck4 |
| f2 | o13 | s13 | ck5 |
| f2 | o14 | s14 | ck1 |
| ... | ... | ... | ... |

Table 113:

| CHUNK NUMBER | OBJECT NUMBER | OFFSET | SIZE | THE NUMBER OF REFERENCES |
|---|---|---|---|---|
| ck1 | ob1 | of1 | sz1 | 1 |
| ck2 | ob1 | of2 | sz2 | 2 |
| ck3 | ob1 | of3 | sz3 | 3 |
| ck4 | ob1 | of4 | sz4 | 1 |
| ... | ... | ... | ... | ... |

Table 115:

| OBJECT NUMBER | THE NUMBER OF VALID CHUNKS | THE NUMBER OF INVALID CHUNKS |
|---|---|---|
| ob1 | 9824 | 176 |
| ob2 | 9653 | 347 |
| ... | ... | ... |

| NODE NUMBER | FILTER ADDRESS | | | | FILTER SIZE | CHILD NODE NUMBER | | | |
|---|---|---|---|---|---|---|---|---|---|
| | 0x00 | 0x01 | ... | 0xFF | | 1 | 2 | ... | d |
| 1 | 0x... | 0x... | ... | 0x... | 0x... | 2 | 3 | ... | d+1 |
| 2 | 0x... | 0x... | ... | 0x... | 0x... | ... | ... | ... | ... |
| ... | ... | ... | ... | ... | ... | ... | ... | ... | ... |

FIG. 24

| NODE NUMBER | FILTER ADDRESS | FILTER SIZE | BITMAP | CHILD NODE NUMBER ||||
|---|---|---|---|---|---|---|---|
| | | | | 1 | 2 | ... | d |
| 1 | 0x... | 0x... | 0x... | 2 | 3 | ... | d+1 |
| 2 | 0x... | 0x... | 0x... | ... | ... | ... | ... |
| ... | ... | ... | ... | ... | ... | ... | ... |

116a1

DATA PROCESSING APPARATUS, NON-TRANSITORY COMPUTER-READABLE STORAGE MEDIUM, AND DATA PROCESSING METHOD

CROSS-REFERENCE TO RELATED APPLICATION

This application is based upon and claims the benefit of priority of the prior Japanese Patent Application No. 2019-222855, filed on Dec. 10, 2019, the entire contents of which are incorporated herein by reference.

FIELD

The embodiments discussed herein are related to a data processing apparatus, non-transitory computer-readable storage medium, and a data processing method.

BACKGROUND

The Bloom filter is a data structure used to determine whether data to be the search target is contained in a data set containing a plurality of data elements. As an example of application of the Bloom filter, a hierarchical Bloom filter having Bloom filters of multiple levels has been proposed.

One of the general characteristics of such a Bloom filter is that even when some data elements are deleted from a data set to be managed, the number of bits of the Bloom filter is not allowed to be reduced. To deal with this, the following data processing apparatus has been proposed.

When data elements are to be deleted, this data processing apparatus deletes a bit array with the number of bits corresponding to the number of data elements to be deleted from the higher-level side of the Bloom filter. Upon input of a data element to be the search target, the data processing apparatus adds a bit array having the same number of bits as that of the deleted bit array and all the bit values of which are "1" to the higher side of the Bloom filter from which the bit array has been deleted. The data processing apparatus determines whether the data element to be the search target is contained in the data set by using the Bloom filter to which the bit array has been added. In this way, it is possible to determine the presence or absence of the data element by using the Bloom filter from which the bit array has been deleted, without causing a false negative.

Related techniques are disclosed in for example Japanese Laid-open Patent Publication Nos. 2011-186954 and No. 2019-95986

SUMMARY

According to an aspect of the embodiments, a data processing apparatus includes: a memory configured to store a first bit array including a first Bloom filter and a second Bloom filter, the first Bloom filter associated with a first data subset containing a data element that matches a first classification condition among data elements contained in a first data set, the second Bloom filter associated with a second data subset containing a data element that matches a second classification condition among the data elements contained in the first data set; and a processor coupled to memory and configured to: when a first data element to be a search target is inputted, determine whether the same data element as the first data element is present in the first data subset by using the first Bloom filter in a case where the first data element matches the first classification condition, determine whether the same data element as the first data element is present in the second data subset by using the second Bloom filter in a case where the first data element matches the second classification condition, and when all the data elements contained in the first data subset are deleted, delete the first Bloom filter from the first bit array.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a configuration example of management tables;

FIG. 24 is a diagram illustrating a configuration example of a filter management table in a first modification.

DESCRIPTION OF EMBODIMENTS

In the related art, the above-described data processing apparatus has a problem that when the presence or absence of a data element is determined by using the Bloom filter from which a bit array has been deleted, the false positive rate increases from before the deletion of the bit array.

According to one aspect, an object of the disclosure is to provide a data processing apparatus and a data processing program which suppress an increase in false positive rate attributable to a reduction of bits of Bloom filters in accordance with a reduction in the number of data elements.

Embodiments of the present disclosure are described below with reference to the drawings.

First Embodiment

Figure 1:
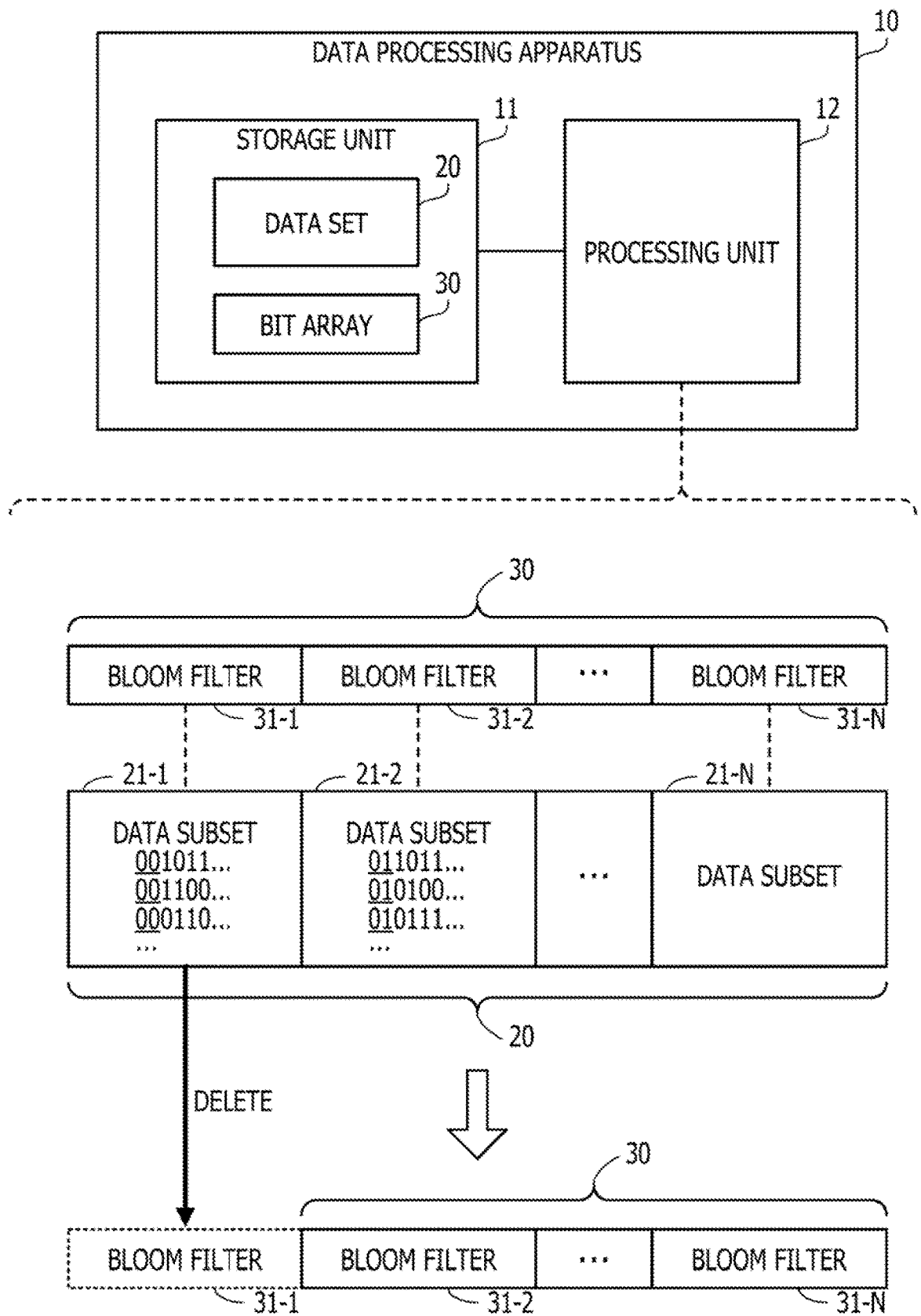
FIG. 1 is a diagram illustrating a configuration example and a processing example of a data processing apparatus according to a first embodiment.

FIG. 1 is a diagram illustrating a configuration example and a processing example of a data processing apparatus according to a first embodiment. A data processing apparatus 10 illustrated in FIG. 1 includes a storage unit 11 and a processing unit 12.

The storage unit 11 is implemented, for example, as a storage area of a storage device (not illustrated) included in the data processing apparatus 10. The storage unit 11 stores a data set 20 containing a plurality of data elements and a bit array 30 used to determine the presence or absence of a data element in the data set 20. The data set 20 does not have to be stored inside the data processing apparatus 10. For example, some of the data elements contained in the data set 20 may be cached inside the data processing apparatus 10.

The processing unit 12 is implemented, for example, as a processor (not illustrated) included in the data processing apparatus 10. Upon input of a data element to be the search target, the processing unit 12 determines whether the same data element as the inputted data element is present in the data set 20, by using the bit array 30.

The data set 20 and the bit array 30 are further described using FIG. 1. The data elements included in the data set 20 are classified into N data subsets 21-1, 21-2, ..., 21-N (N is an integer of 2 or more) in accordance with N classification conditions different from one another. For example, the data subset 21-1 (a first data subset) contains data elements that match a first classification condition among the data elements contained in the data set 20. The data subset 21-2 (a second data subset) contains data elements that match a second classification condition among the data elements contained in the data set 20.

As the classification conditions, for example, bit values within a predetermined range in bit arrays of data elements are used. For example, in the case where the values of high-order 2 bits of a data element are used, 3 classification conditions in each of which the values of the high-order 2 bits are any one of sets "00", "01", and "11" are applied. In this case, for example, a data element in which the values of the high-order 2 bits are "00" is classified into a certain data subset, a data element in which the values of the high-order 2 bits are "01" is classified into another data subset, and a data element in which the values of the high-order 2 bits are "11" is classified into still another data subset.

On the other hand, the bit array 30 is divided into N partial bit arrays having the same size, and each of the partial bit arrays is used as an individual Bloom filter. Specifically, for example, the bit array 30 contains Bloom filters 31-1, 31-2, ..., 31-N. The Bloom filters 31-1, 31-2, ..., 31-N are associated with the data subsets 21-1, 21-2, ..., 21-N, respectively.

The Bloom filters 31-1, 31-2, ..., 31-N are used to determine the presence or absence of a data element in the corresponding data subsets 21-1, 21-2, ..., 21-N, respectively. Hence, in the Bloom filters 31-1, 31-2, ..., 31-N, bit values are set by a predetermined calculation using data elements contained in the corresponding data subsets 21-1, 21-2, ..., 21-N, respectively. For example, the bit value of each bit of the Bloom filter 31-1 is set by the predetermined calculation using each data element contained in the data subset 21-1. The bit value of each bit of the Bloom filter 31-2 is set by the predetermined calculation using each data element contained in the data subset 21-2.

Upon input of a data element to be the search target (referred to as "inputted data element"), the processing unit 12 determines whether the same data element as the inputted data element is present in the data set 20, as described below. The processing unit 12 determines which classification condition the inputted data element matches. In the case where the inputted data element matches a certain classification condition, the processing unit 12 uses the Bloom filter corresponding to the certain classification condition to determine whether the same data element as the inputted data element is present in the data subset corresponding to the Bloom filter.

For example, in the case where the inputted data element matches the first classification condition corresponding to the data subset 21-1, the processing unit 12 determines whether the same data element as the inputted data element is present in the data subset 21-1 by using the Bloom filter 31-1. In the case where the inputted data element matches the second classification condition corresponding to the data subset 21-2, the processing unit 12 determines whether the same data element as the inputted data element is present in the data subset 21-2 by using the Bloom filter 31-2.

Next, the case where a data element contained in the data set 20 is deleted is described. In the case where all the data elements contained in a certain data subset have been deleted, the processing unit 12 deletes the Bloom filter corresponding to the certain data subset from the bit array 30. This means that in the case where all the data elements that match a certain classification condition have been deleted from the data set 20, it is possible to delete the Bloom filter corresponding to the certain classification condition from the bit array 30.

For example, as illustrated in FIG. 1, in the case where all the data elements that match the above-described first classification condition have been deleted from the data set 20, or in the case where all the data elements contained in the data subset 21-1 have been deleted, the processing unit 12 deletes the Bloom filter 31-1 from the bit array 30.

Such a deleting process makes it possible to reduce the number of bits in the bit array 30 that are used as the Bloom filters without increasing the false positive rate in determining the presence or absence of an inputted data element in the data set 20. For example, even when the Bloom filter 31-1 has been deleted by the above-described procedure, in the case where the presence or absence of an inputted data element is determined for the data subsets 21-2, ..., 21-N by using the Bloom filters 31-2, ..., 31-N, respectively, the rate of occurrence of the false positive does not change. In the case where an inputted data element that matches the first classification condition has been inputted with the Bloom filter 31-1 having been deleted by the above-described procedure, since the Bloom filter 31-1, which corresponds to the first classification condition, is not present, it allows the processing unit 12 to correctly determine that the same data element as the inputted data element is not present in the data set 20. In this case, neither the false negative rate nor the false positive rate changes as compared to those before the deletion of the Bloom filter 31-1.

Hence, according to the data processing apparatus 10 of the first embodiment, it is possible to suppress an increase in false positive rate attributable to a reduction of bits of the Bloom filters in accordance with the reduction in the number of data elements.

As a method of reducing the number of bits in the bit array 30 in accordance with the reduction in the number of data elements, a method as described below may be considered. For example, the entire bit array 30 is used as a single Bloom filter to determine the presence or absence of a data element for the entire data set 20 with this Bloom filter. When some of the data elements contained in the data set 20 have been deleted, the number of bits in the bit array 30 is reduced in accordance with the number of deleted data elements, and all the bit values of the bit array 30 after the reduction in the number of bits are reset. All the data elements remaining in the data set 20 are used to set the bit values for the bit array 30 after the reduction of bits again.

This method also makes it possible to reduce the number of bits in the bit array 30 without increasing the false positive rate. This however involves calculation for setting the bit values for the bit array 30 after the reduction of bits again, and causes a high processing load at the time of reducing the number of bits. According to the data processing apparatus 10 of the first embodiment, since such calculation does not have to be conducted at the time of reducing the number of bits for the bit array 30, it is possible to suppress the processing load at the time of reducing the number of bits.

Applying the above-described bit array 30 to each node of a hierarchical Bloom filter makes it possible to reduce the number of bits in the bit arrays 30 in accordance with the reduction of data elements over multiple levels while suppressing an increase of the false positives. In a second embodiment below, an example of an information processing system including such a hierarchical Bloom filter is described.

Second Embodiment

Figure 2:
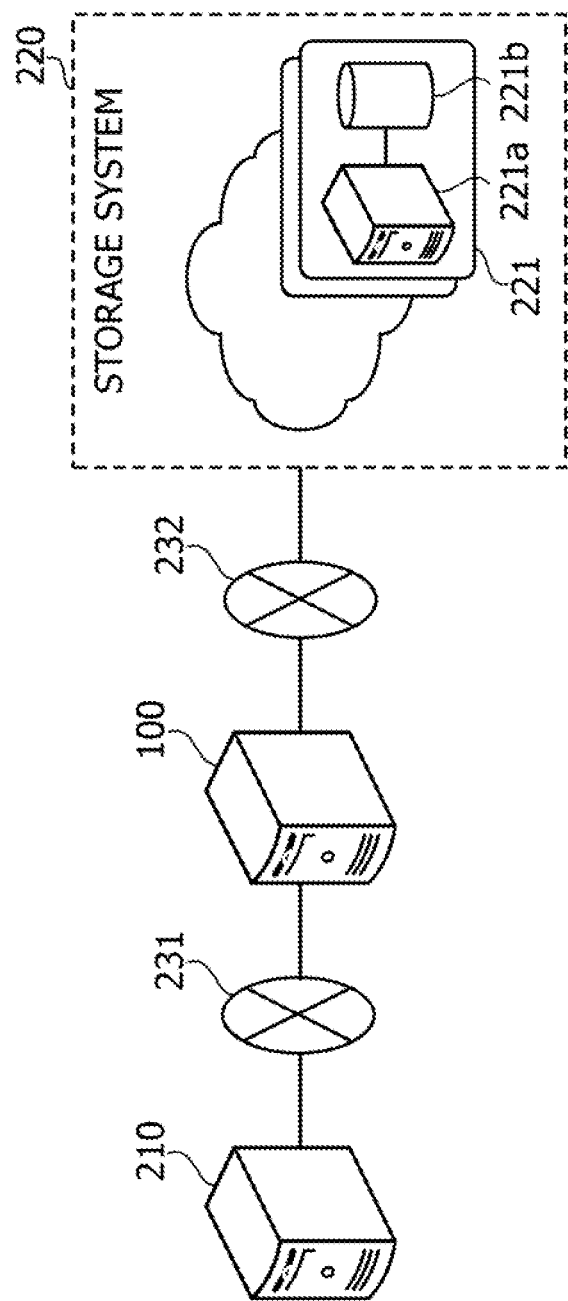
FIG. 2 is a diagram illustrating a configuration example of an information processing system according to a second embodiment.

FIG. 2 is a diagram illustrating a configuration example of the information processing system according to the second embodiment. The information processing system illustrated in FIG. 2 includes a cloud storage gateway 100, a network attached storage (NAS) client 210, and a storage system 220. The cloud storage gateway 100 is coupled to the NAS client 210 via a network 231, and is also coupled to the storage system 220 via a network 232. The network 231 is, for example, a local area network (LAN), and the network 232 is, for example, a wide area network (WAN).

The storage system 220 provides a cloud storage service via the network 232. In the following description, a storage area made available to a service user (here, the cloud storage gateway 100) by the cloud storage service provided by the storage system 220 is sometimes referred to as "cloud storage".

In this embodiment, as an example, the storage system 220 is implemented by an object storage in which data is managed in units of object. For example, the storage system 220 is implemented as a distributed storage system having a plurality of storage nodes 221 each including a control server 221a and a storage device 221b. In this case, in each storage node 221, the control server 221a controls access to the storage device 221b, and part of the cloud storage is implemented by a storage area of the storage device 221b. The storage node 221 to be the storage destination of an object from the service user (cloud storage gateway 100) is determined based on information unique to the object.

The NAS client 210 recognizes the cloud storage gateway 100 as a NAS server that provides a storage area managed by a file system. The storage area is a storage area of the cloud storage provided by the storage system 220. The NAS client 210 then requests the cloud storage gateway 100 to read and write data in units of file according to, for example, the Network File System (NFS) protocol or the Common Internet File System (CIFS) protocol. Specifically, for example, a NAS server function of the cloud storage gateway 100 allows the NAS client 210 to use the cloud storage as a large-capacity virtual network file system.

The NAS client 210 executes, for example, backup software for data backup. In this case, the NAS client 210 backs up a file stored in the NAS client 210 or a file stored in a server (for example, a business server) coupled to the NAS client 210, to a storage area provided by the NAS server.

The cloud storage gateway 100 is an example of the data processing apparatus 10 illustrated in FIG. 1. The cloud storage gateway 100 relays data transferred between the NAS client 210 and the cloud storage.

For example, the cloud storage gateway 100 receives a file write request from the NAS client 210 and caches a file for which the write request is made in the cloud storage gateway 100 by using the NAS server function. The cloud storage gateway 100 divides the file for which the write request is made in units of chunk and stores actual data within the chunks (chunk data) in the cloud storage. At this time, a predetermined number of chunk data are grouped to generate an object, and the generated object is transferred to the cloud storage.

When caching the file from the NAS client 210, the cloud storage gateway 100 performs "deduplication" by dividing the file in units of chunks and avoiding duplicate saving of chunk data having the same contents. The chunk data may also be stored in a compressed state. For example, in a cloud storage service, a fee is charged depending on the amount of data to be stored in some cases. Performing deduplication and data compression reduces the amount of data stored in the cloud storage and suppresses the service use cost.

Figure 3:
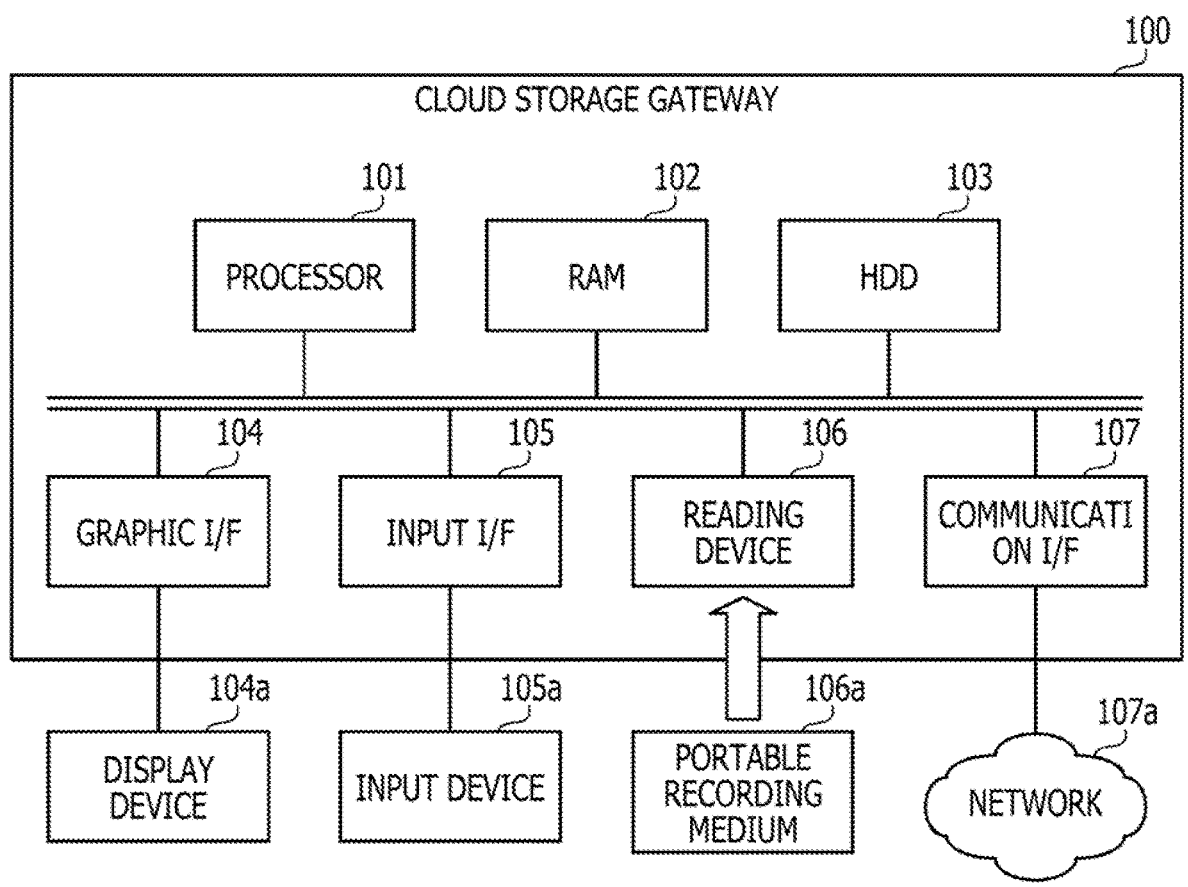
FIG. 3 is a block diagram illustrating a hardware configuration example of a cloud storage gateway.

FIG. 3 is a block diagram illustrating a hardware configuration example of the cloud storage gateway. The cloud storage gateway 100 is implemented as, for example, a computer as illustrated in FIG. 3.

The cloud storage gateway 100 includes a processor 101, a random-access memory (RAM) 102, a hard disk drive (HDD) 103, a graphic interface (I/F) 104, an input interface (I/F) 105, a reading device 106, and a communication interface (I/F) 107.

The processor 101 generally controls the entire cloud storage gateway 100. The processor 101 is, for example, a central processing unit (CPU), a microprocessor unit (MPU), a digital signal processor (DSP), an application-specific integrated circuit (ASIC), or a programmable logic device (PLD). The processor 101 may also be a combination of two or more elements of the CPU, the MPU, the DSP, the ASIC, and the PLD.

The RAM 102 is used as a main storage device of the cloud storage gateway 100. At least part of an operating system (OS) program and an application program to be executed by the processor 101 is temporarily stored in the RAM 102. Various kinds of data to be used in processing by the processor 101 are also stored in the RAM 102.

The HDD 103 is used as an auxiliary storage device of the cloud storage gateway 100. The OS program, the application program, and various kinds of data are stored in the HDD 103. A different type of nonvolatile storage device such as a solid-state drive (SSD) may be used as the auxiliary storage device.

A display device 104a is coupled to the graphic interface 104. The graphic interface 104 displays an image on the display device 104a according to a command from the processor 101. The display device includes a liquid crystal display, an organic electroluminescence (EL) display, and the like.

An input device 105a is coupled to the input interface 105. The input interface 105 transmits a signal outputted from the input device 105a to the processor 101. The input device 105a includes a keyboard, a pointing device, and the like. The pointing device includes a mouse, a touch panel, a tablet, a touch pad, a track ball, and the like.

A portable recording medium 106a is removably mounted on the reading device 106. The reading device 106 reads data recorded in the portable recording medium 106a and transmits the data to the processor 101. The portable recording medium 106a includes an optical disc, a semiconductor memory, and the like.

The communication interface 107 exchanges data with other apparatuses via a network 107a.

The processing functions of the cloud storage gateway 100 may be implemented by the hardware configuration as described above. The NAS client 210 and the control server 221a may also be implemented as computers having the same hardware configuration as that in FIG. 3.

Figure 4:
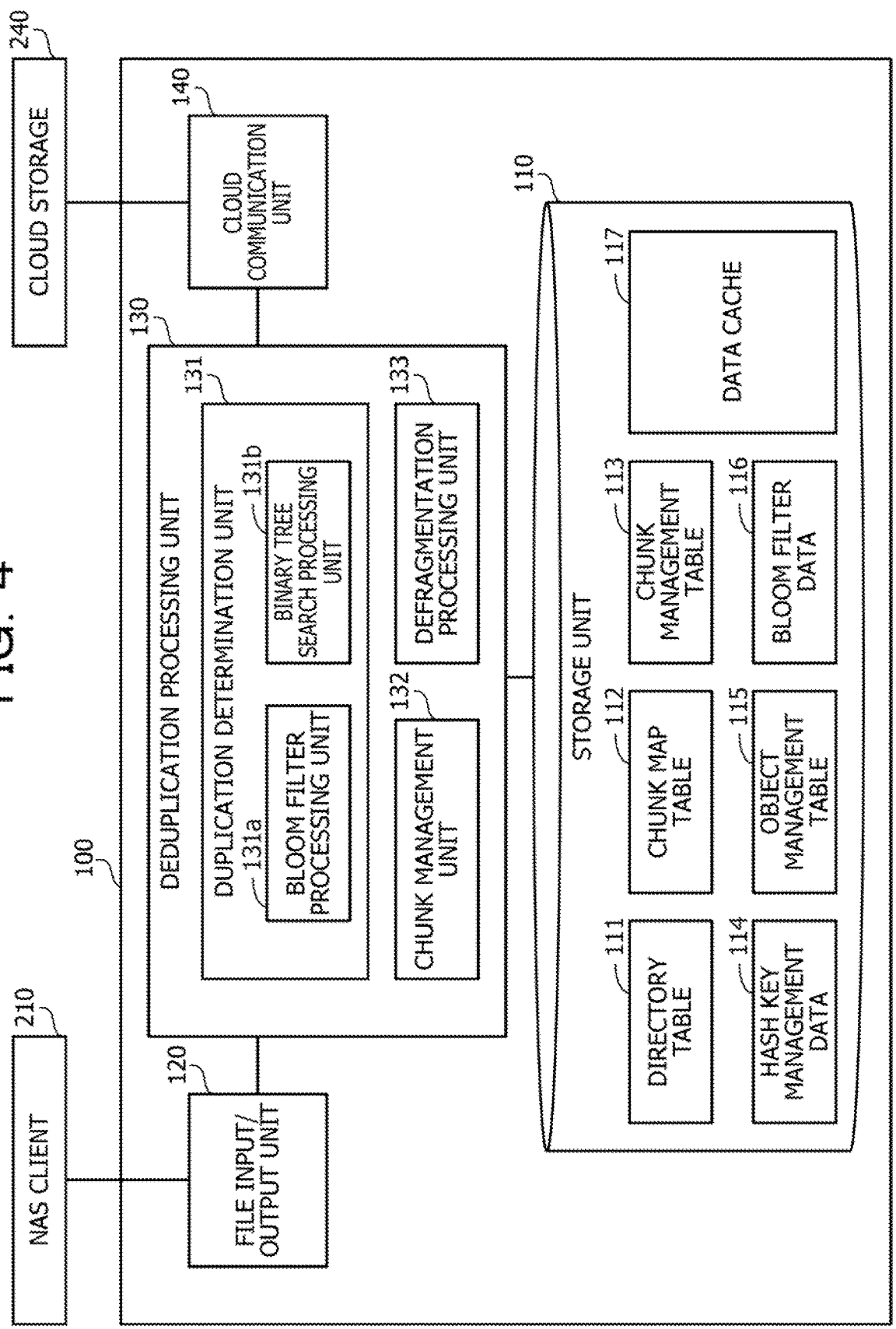
FIG. 4 is a block diagram illustrating a configuration example of processing functions included in the cloud storage gateway.

FIG. 4 is a block diagram illustrating a configuration example of processing functions included in the cloud storage gateway. The loud storage gateway 100 includes a storage unit 110, a file input/output unit 120, a deduplication processing unit 130, and a cloud communication unit 140.

The storage unit 110 is implemented as, for example, a storage area of a storage device included in the cloud storage gateway 100, such as the RAM 102 or the HDD 103. Processing of the file input/output unit 120, the deduplication processing unit 130, and the cloud communication unit 140 is implemented, for example, by causing the processor 101 to execute a predetermined program.

The storage unit 110 stores a directory table 111, a chunk map table 112, a chunk management table 113, a hash key management data 114, an object management table 115, and a Bloom filter data 116. Part of the storage area of the storage unit 110 is used as a data cache 117.

The directory table 111 is management information for representing a directory structure in a file system. In the directory table 111, records corresponding to directories (folders) in the directory structure or to files in the directories are registered. In each record, an inode number for identifying a directory or a file is registered. For example, relationships between directories and relationships between directories and files are expressed by registering the inode number of the parent directory in each record.

The chunk map table 112 is management information for managing correspondences between files and deduplicated chunks. The chunk management table 113 is management information for managing correspondences between chunks and objects, and the number of references of chunks.

The hash key management data 114 is management information for managing the hash key corresponding to the chunk. In the hash key management data 114, the hash keys are classified and managed for each lowest node in the hierarchical Bloom filter as described later.

The object management table 115 is management information for managing, for each object, the number of valid chunks indicating valid chunks among chunks included in the object and the number of invalid chunks indicating invalid chunks among chunks included in the object. The object management table 115 is used to determine the desirability of executing defragmentation of objects stored in a cloud storage 240.

The Bloom filter data 116 is management information for managing data related to the hierarchical Bloom filter. The Bloom filter data 116 contains management information indicating the configuration of the hierarchical Bloom filter and bit arrays which actually serve as the Bloom filters. This hierarchical Bloom filter is utilized for the duplication determination of chunks.

The data cache 117 is a storage area for caching deduplicated chunks. Data of chunks corresponding to a file for which the write request is made from the NAS client 210 is deduplicated and temporarily stored in the data cache 117 and then, incorporated into an object and stored in the cloud storage 240. When the capacity of the data cache 117 has decreased due to the chunks stored, chunks that have been stored in the cloud storage 240 and are infrequently accessed from the NAS client 210 are deleted from the data cache 117.

The file input/output unit 120 executes interface processing as a NAS server. For example, the file input/output unit 120 accepts a file write/read request from the NAS client 210, requests the deduplication processing unit 130 to execute processing corresponding to the requested contents, and responds to the NAS client 210.

In response to the request from the deduplication processing unit 130, the cloud communication unit 140 executes communication processing with the cloud storage 240. For example, the deduplication processing unit 130 transmits and receives objects to and from the cloud storage 240, which is the object storage. The deduplication processing unit 130 uploads objects to the cloud storage 240 according to a PUT command. The deduplication processing unit 130 acquires objects from the cloud storage 240 according to a GET command. The deduplication processing unit 130 deletes objects in the cloud storage 240 according to a DELETE command.

The deduplication processing unit 130 executes processing of storing deduplicated actual data of a file. The deduplication processing unit 130 includes a duplication determination unit 131, a chunk management unit 132, and a defragmentation processing unit 133.

The duplication determination unit 131 divides actual data of a file for which the write request is made in units of chunk, and stores the divided actual data in the data cache 117 while deduplicating the divided actual data. The duplication determination unit 131 includes a Bloom filter processing unit 131a and a binary tree search processing unit 131b.

The Bloom filter processing unit 131a and the binary tree search processing unit 131b execute processing to search for the same chunk as the chunk divided from the file from among chunks registered in the chunk management table 113 (stored chunks). The Bloom filter processing unit 131a narrows a chunk group containing the same chunk as the chunk divided from the file by using the hierarchical Bloom filter. The binary tree search processing unit 131b searches for the same chunk as the chunk divided from the file from among the narrowed chunk group through the binary tree search.

The chunk management unit 132 collects a plurality of chunks stored in the data cache 117 by the duplication determination unit 131 to generate an object of proper size, and stores the object in the cloud storage 240 via the cloud communication unit 140. In this embodiment, as an example, a predetermined number of chunks form an object.

The defragmentation processing unit 133 monitors chunks that have become unreferenced due to file updating or delete request (invalid chunks) and performs defragmentation based on the monitoring result. The defragmentation is processing of deleting the occurred invalid chunks from the cloud storage 240 to reduce the used capacity of the cloud storage 240. In defragmentation, for example, the object containing invalid chunks is acquired from the cloud storage 240, chunks remaining after the deletion of the invalid chunk data reconstruct an object, and the reconstructed object is stored in the cloud storage 240.

FIG. 5 is a diagram illustrating a configuration example of management tables. FIG. 5 illustrates the chunk map table 112, the chunk management table 113, and the object management table 115 among the management tables stored in the storage unit 110.

The chunk map table 112 is management information for managing correspondences between files and stored chunks. As illustrated in FIG. 5, records with items including file number, offset, size, and chunk number are registered in the chunk map table 112. Each record is associated with one chunk generated by dividing the actual data of the file.

The file number indicates the identification number of the file. The offset indicates the amount of offset from the start of the file to the start of the chunk. The size indicates the size of the chunk. An area of the chunk in the file is specified based on values of offset and size.

The chunk number indicates the identification number of the stored chunk corresponding to the chunk of the file. When a first chunk of a certain file and a second chunk of the same or another file have the same data contents, the same chunk number is registered in the record corresponding to the first chunk and the record corresponding to the second chunk. For example, in FIG. 5, the same chunk number "ck1" is registered in a chunk record identified based on a file number "f1" and an offset "o1" and a chunk record identified based on a file number "f2" and an offset "o14". This means that the former chunk and the latter chunk have the same data contents, and the data is stored as the chunk having the chunk number "ck1" in the data cache 117 and the cloud storage 240.

The chunk numbers are added in the order in which unique and unduplicated chunks occur and are stored in the data cache 117. Thus, the chunk number indicates the order occurred or stored of the deduplicated chunk.

The chunk management table 113 is management information for managing correspondences between stored chunks and objects, and the number of references of stored chunks. As illustrated in FIG. 5, records with items including chunk number, object number, offset, size, and the number of references are registered in the chunk management table 113. Each record is associated with one stored chunk.

The object number indicates the identification number of an object to which the chunk belongs. The offset indicates the amount of offset from the start of the object to the start of the chunk. The size indicates the size of the chunk. An area of the chunk in the object is specified based on values of offset and size. The number of references indicates how many chunks among the chunks generated by dividing the file refer to the stored chunk indicated by the chunk number. For example, the number of references indicates among how many chunks on the file, the stored chunk indicated by the chunk number is duplicated. For example, in the case where the number of references corresponding to a certain chunk number is "2", two records that have the same chunk number registered therein are present in the chunk map table 112.

In the example of the chunk map table 112 in FIG. 5, the file having the file number "f1" is divided into two chunks, and the file having the file number "f2" is divided into four chunks. In the example of the chunk management table 113 in FIG. 5, data of the two chunks contained in the former file and data of the first two chunks contained in the latter file are stored as chunks belonging to the object having an object number "ob1" in the cloud storage 240.

In this embodiment, a predetermined number of chunks form one object. Once a new chunk (stored chunk) occurs due to the writing of a file, the chunk is assigned an object number. When the number of chunks contained in a certain object does not reach a predetermined number, the object is managed as being in an "active" state. An active object is assigned a newly occurring chunk sequentially. Once the number of chunks contained in the object reaches the predetermined number, the object is made "inactive" to be allowed to be stored in the cloud storage 240. The object number is added to the object in the order generated. Chunks having consecutive chunk numbers are assigned to one object.

As another generation method for objects, for example, in the case where the total size of chunks assigned to an object has exceeded predetermined size, the object may be made inactive.

As illustrated in FIG. 5, the number of valid chunks and the number of invalid chunks are registered in the object management table 115 in association with the object number. The number of valid chunks indicates the number of valid chunks (chunks having the number of references of 1 or more) among chunks contained in an object. The number of invalid chunks indicates the number of invalid chunks (chunks having the number of references of 0) among chunks contained in an object. This object management table 115 is utilized to determine the desirability of executing defragmentation.

Next, the hierarchical Bloom filter utilized in the processing of the Bloom filter processing unit 131a is utilized.

Figure 6:
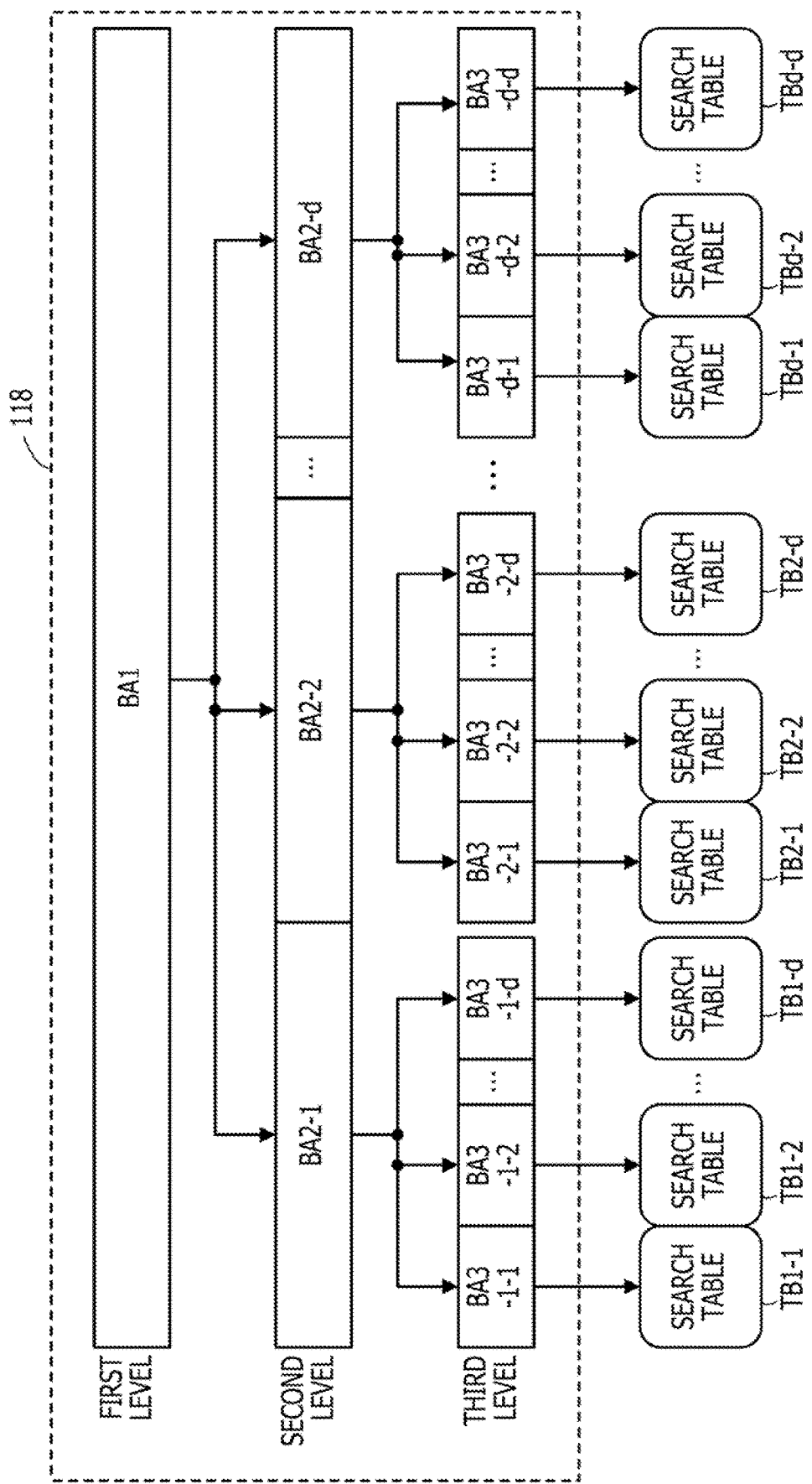
FIG. 6 is a diagram illustrating a configuration example of a hierarchical Bloom filter.

FIG. 6 is a diagram illustrating a configuration example of the hierarchical Bloom filter. A hierarchical Bloom filter 118 illustrated in FIG. 6 is implemented by a tree structure in which a bit array operating as a Bloom filter is assigned to each of nodes. In this way, the hierarchical Bloom filter including Bloom filters of multiple levels is formed. Although the detailed description is given later, the bit array of each node is divided by the same number, and each divided bit array operates as an individual Bloom filter.

In this embodiment, a bit array BA1 having n bits is set in the node of the uppermost first level. The number of bits "n" is determined according to the maximum number of elements to be the search target (specifically, for example, the maximum number of chunks to be registered in the chunk management table 113 of the storage unit 110).

In the next lower level, bit arrays each having the number of bits (1/d) of that of the higher level are placed, the number of which is d times that of the higher level. For example, in the level immediately below a certain node, d nodes are coupled, and the bit array of each node of the lower level has the number of bits (1/d) of that of the higher level. Hence, the total number of bits of bit arrays (Bloom filters) contained in each level is n bits, and the hierarchical Bloom filter 118 occupies a storage area corresponding to the number of bits n times the number of levels.

In this embodiment, as an example, the number of levels of the hierarchical Bloom filter 118 is assumed to be "3". In this case, as illustrated in FIG. 6, in the second level, d bit arrays BA2-1, BA2-2, . . . , BA2-d are placed. The number of bits of each of the bit arrays BA2-1, BA2-2, . . . , BA2-d is (n/d) bits.

In the third level, d bit arrays are placed below each of the bit arrays in the second level. For example, below the bit array BA2-1, d bit arrays BA3-1-1, BA3-1-2, . . . , BA3-1-d are formed. Below the bit array BA2-2, d bit arrays BA3-2-1, BA3-2-2, . . . , BA3-2-d are formed. Below the bit array BA2-d, d bit arrays BA3-d-1, BA3-d-2, . . . , BA3-d-d are formed. Hence, in the third level, $d^2$ bit arrays in total are placed. The number of bits of each of these bit arrays is $(n/d^2)$ bits.

A chunk group to be the search target for is assigned to the bit array of each node in the third level. The actual search is conducted by using a hash key, which is a hash value calculated based on data of the chunk. In this embodiment, the search targets of the bit arrays of the respective nodes in the third level are given as search tables in each of which the hash keys based on the respective chunks are registered.

For example, search tables TB1-1, TB1-2, . . . , TB1-d are assigned to the respective bit arrays BA3-1-1, BA3-1-2, . . . , BA3-1-d, as the search targets. Search tables TB2-1, TB2-2, . . . , TB2-d are assigned to the respective bit arrays BA3-2-1, BA3-2-2, . . . , BA3-2-d, as the search targets. Search tables TBd-1, TBd-2, . . . , TBd-d are assigned to the respective bit arrays BA3-d-1, BA3-d-2, . . . , BA3-d-d, as the search targets. These search tables contain chunk data belonging to 20 objects at the maximum, for example.

The search target for the bit array of each node in the second level is all the search tables that are the search targets for the respective bit arrays placed below the above-mentioned bit array. For example, the search target of the bit array BA2-1 is the search tables TB1-1, TB1-2, . . . , TB1-d. Similarly, the search target for the bit array BA1 in the first level is all the search tables that are the search targets for the bit arrays BA2-1, BA2-2, . . . , BA2-d placed below the bit array BA1. Hence, the search target for the bit array BA1 in the first level is all the chunks registered in the chunk management table 113.

Every time an inactive object occurs, a hash key corresponding to a chunk belonging to the object is added to the search table. For example, when an inactive object occurs first, a hash key based on a chunk belonging to the object is added to the first search table TB1-1. Thereafter, along with the occurrence of inactive objects, hash keys corresponding to 20 objects are added to the search table TB1-1. When the 21st inactive object occurs, a hash key corresponding to a chunk belonging to the object is added to the next search table TB1-2. In this way, hash keys corresponding to 20 objects at the maximum are contained in each search table.

Figure 7:
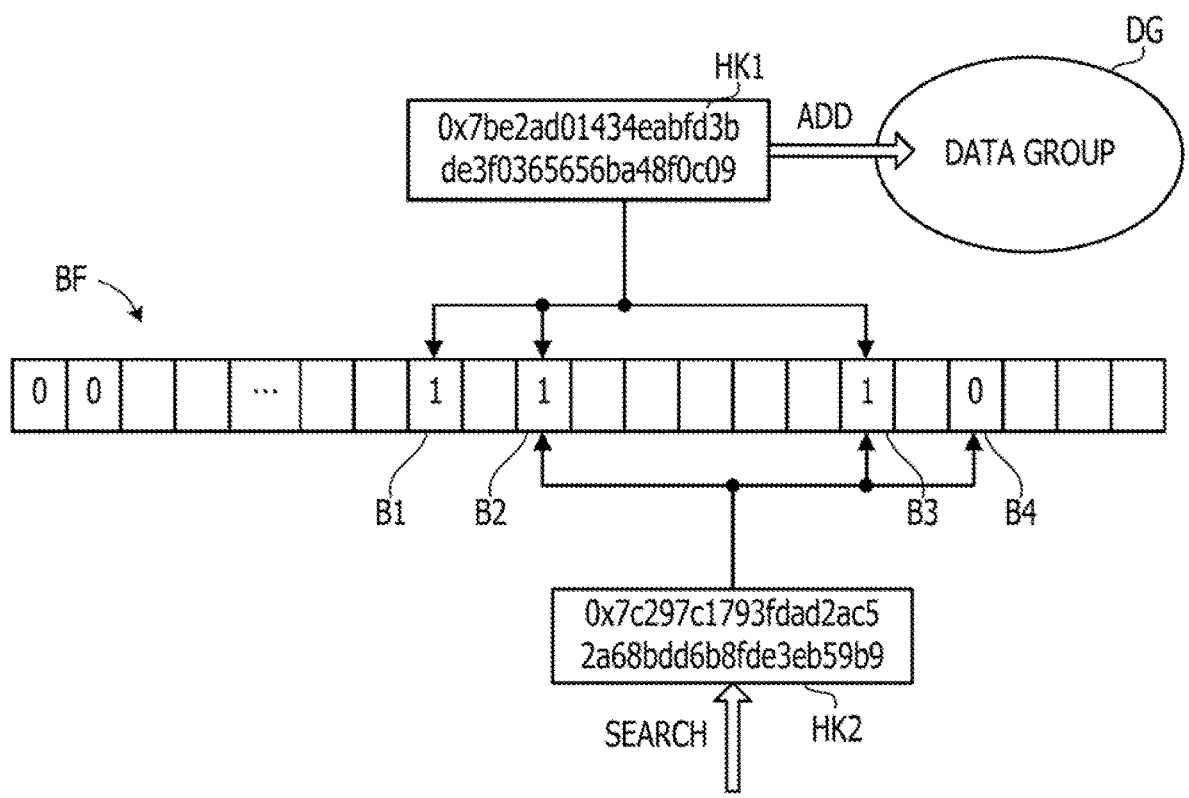
FIG. 7 is a diagram illustrating a processing example using Bloom filters.
Figure 8:
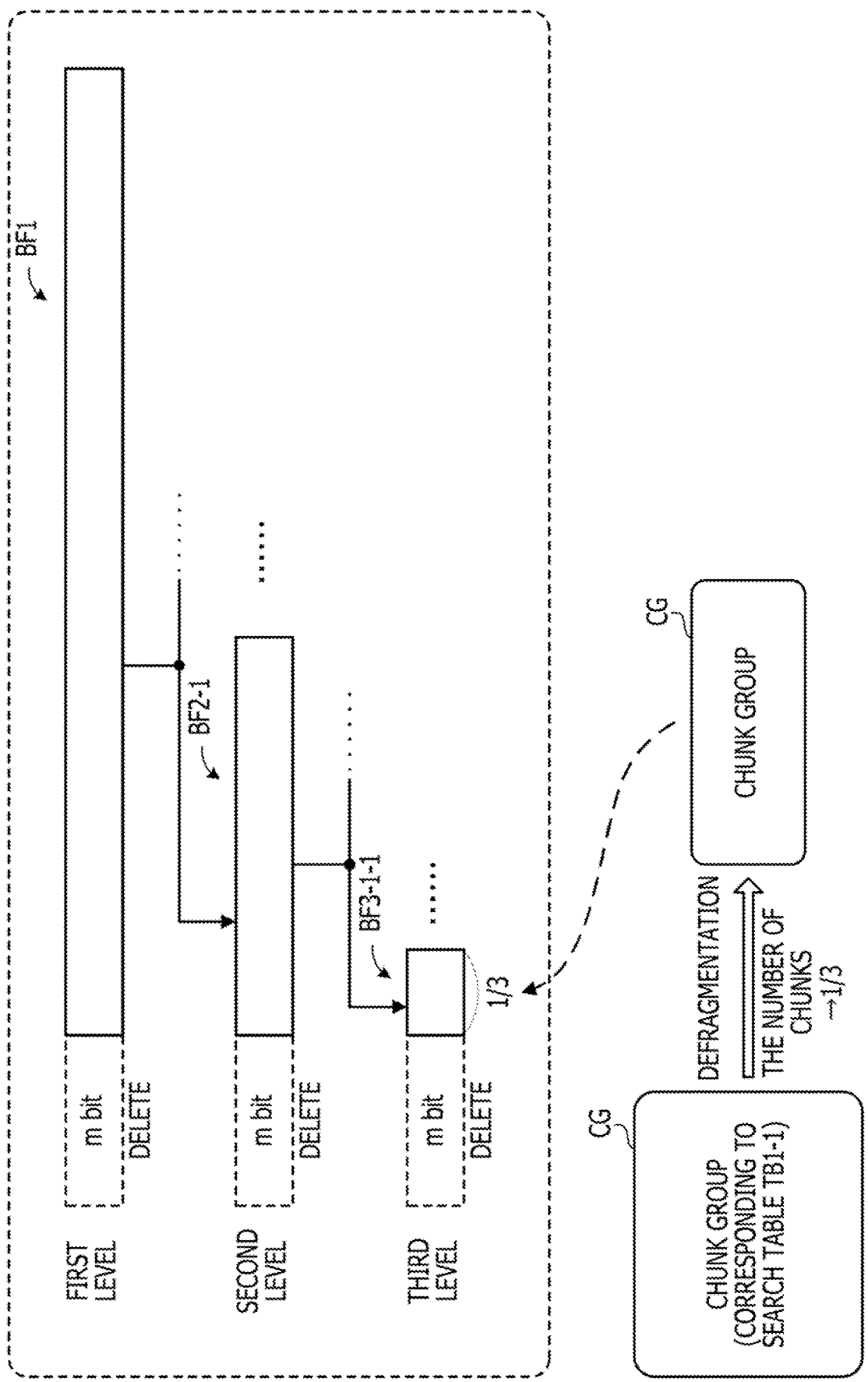
FIG. 8 is a diagram illustrating a comparative example of processing of reducing the number of bits in a hierarchical Bloom filter.
Figure 9:
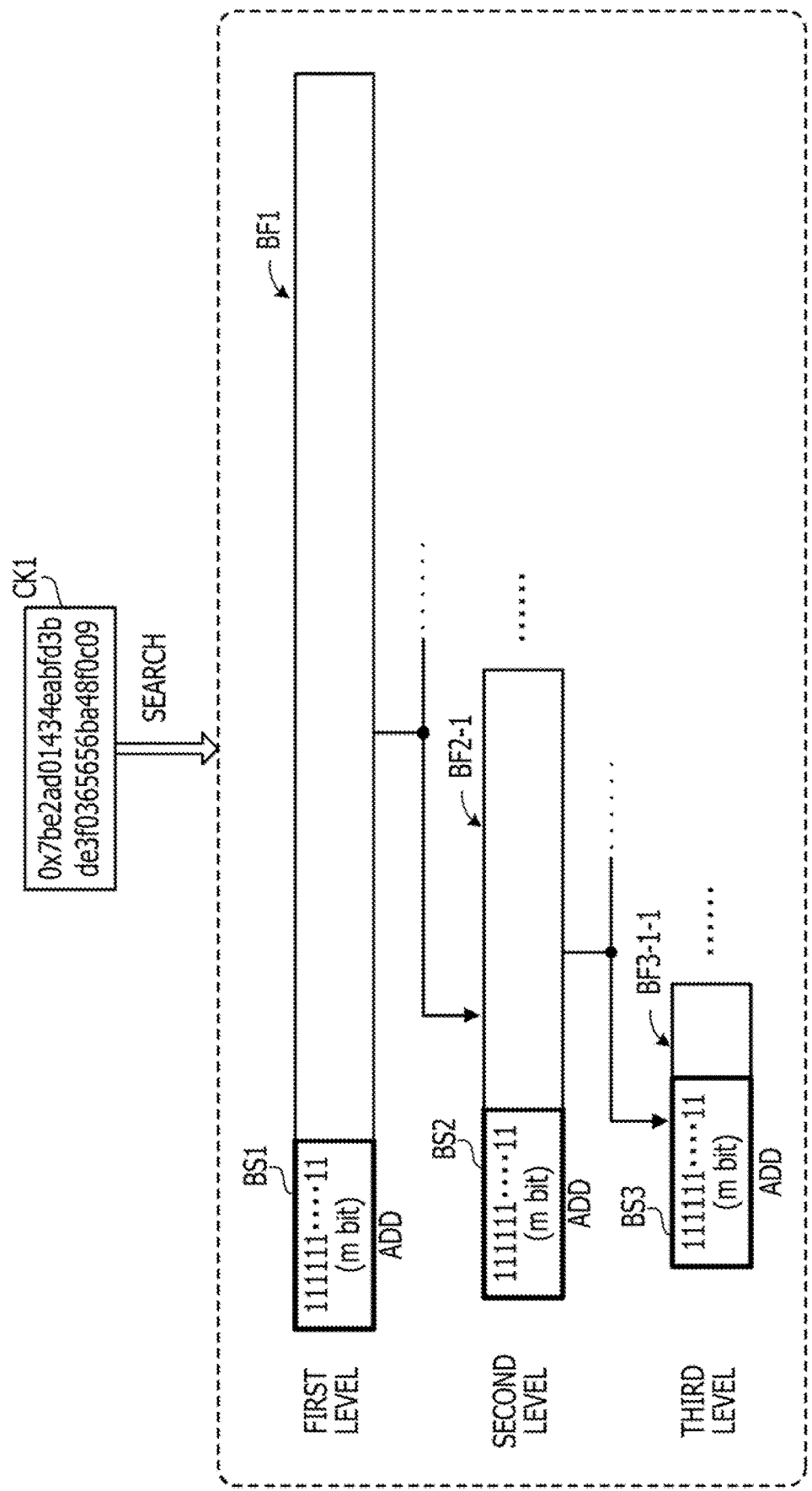
FIG. 9 is a diagram illustrating a comparative example of search processing using a Bloom filter in which the number of bits has been reduced.

A processing example in the case where the bit arrays of the respective nodes in the hierarchical Bloom filter 118 illustrated in FIG. 6 are used as individual Bloom filters is described as a comparative example using FIGS. 7 to 9. In this case, the hierarchical Bloom filter 118 is a hierarchical Bloom filter having a general configuration in which Bloom filters are simply multi-layered.

First, FIG. 7 is a diagram illustrating a processing example using Bloom filters. A Bloom filter BF illustrated in FIG. 7 indicates the Bloom filter of any one node. All the values of the bits of all the Bloom filters contained in the hierarchical Bloom filter are set to "0" in the initial state before data is inserted into a data group to be the search target.

First, the case where a hash key HK1 is added to a data group DG (set of hash keys) which is assigned to the Bloom filter BF as the search target is described. In this case, calculations using k types of hash functions are conducted on the hash key HK1 to calculate k hash values. The positions of k bits whose bit value is to be set to "1" are specified based on the k hash values calculated.

In FIG. 7, k=3 as an example. Remainders obtained by dividing values calculated by using 3 types of hash functions from the hash key HK1 by the number of bits of the Bloom filter BF are specified as bit numbers whose bit value is set to "1". In the example of FIG. 7, when bits B1, B2, and B3 are supposed to have been specified, the value of each of the bits B1, B2, and B3 is set to "1".

Next, the case where it is determined whether a hash key HK2 based on a chunk divided from a certain file is contained in the data group DG is described. In this case, the positions of bits whose bit values are set to "1" are specified based on hash values calculated by using k types of hash functions from the hash key HK2 in the same procedure as described above. In the example of FIG. 7, when bits B2, B3, and B4 are supposed to have been specified, the value of each of the bits B2, B3, and B4 is acquired from the Bloom filter BF.

In the case where all the values of the bits B2, B3, and B4 are "1", it is determined there is a possibility that the hash key HK2 is contained in the data group DG. However, it does not mean it is guaranteed that the hash key HK2 is contained in the data group DG (false positive). On the other hand, in the case where the value of at least one of the bits B2, B3, and B4 is "0", it is determined that the hash key HK2 is not contained in the data group DG.

This is the basic processing using a Bloom filter. Next, a processing example in the case where the bit arrays of the respective nodes in the hierarchical Bloom filter 118 illustrated in FIG. 6 are used as individual Bloom filters is described.

In the hierarchical Bloom filter, at the time of adding a hash key, the setting of a bit value "1" for the Bloom filter is conducted sequentially from the lowest Bloom filter to the upper levels. For example, in FIG. 6, in the case of adding a hash key to the search table TB1-1, the processing of setting 3 bit values to "1" is first conducted on the bit array BA3-1-1 (Bloom filter) assigned to the search table TB1-1 in the third level. The processing of setting 3 bit values to "1" is conducted on the bit array BA2-1 (Bloom filter) in the upper level. The processing of setting 3 bit values to "1" is conducted on the bit array BA1 (Bloom filter) in the upper level.

On the other hand, at the time of determining the presence or absence of a hash key, the bit values are referred to sequentially from bit array BA1 (Bloom filter) in the highest level to the lower levels. Specifically, for example, the bit array BA1 (Bloom filter) in the first level is first referred to, and it is determined whether all the 3 bit values specified by hash calculation are "1". In the case where all the 3 bit values are "1", it is next determined whether all the 3 bit values specified by hash calculation are "1" for each of the bit arrays BA2-1, BA2-2, . . . , BA2-*d* (Bloom filters) in the second level.

For example, it is assumed that all the 3 bit values specified in the bit array BA2-1 (Bloom filter) are "1". In this case, it is determined whether all the 3 bit values specified by hash calculation are "1" for each of the bit arrays BA3-1-1, BA3-1-2, . . . , BA3-1-*d* (Bloom filters) belong to the level below the bit array BA2-1 (Bloom filter).

For example, it is assumed that all the 3 bit values specified in the bit array BA3-1-1 (Bloom filter) are "1". In this case, it is determined there is a possibility that the desired hash key is present in the search table TB1-1 assigned to the bit array BA3-1-1 (Bloom filter).

The number of bits of each Bloom filter of the hierarchical Bloom filter is determined according to the number of elements to be the search target (specifically, for example, the number of chunks registered in the chunk management table 113). The more the number of elements to be the search target, the more the number of bits of each Bloom filter. For this reason, The storage area occupied by data constituting the hierarchical Bloom filter is also increased.

On the other hand, as the nature of a general Bloom filter, even in the case where the number of elements to be the search target has decreased, the number of bits of the Bloom filter is not allowed to be reduced. This is because even when a bit whose bit value is found to be "1" by calculation based on a deleted element is deleted from the bits of the Bloom filter, there is a possibility that the bit value of the bit is found to be "1" by calculation based on another element. In such a case, false negative occurs in the search processing using the Bloom filter after the deletion of the bit.

To deal with such problem, a method of reducing the number of bits as illustrated in FIGS. 8 and 9, which is described below, is considered.

FIG. 8 is a diagram illustrating a comparative example of processing of reducing the number of bits in a hierarchical Bloom filter.

A chunk group CG illustrated in FIG. 8 corresponds to the search table TB1-1 illustrated in FIG. 6 as an example. Specifically, for example, a hash key based on each chunk contained in the chunk group CG has been registered in the search table TB-1. In FIG. 8, as an example, the case where the number of chunks contained in the chunk group CG has been reduced by defragmentation processing of objects is assumed. The defragmentation processing is processing of re-storing fragmented valid chunks (chunks with the number of references being "1" or more) among chunks contained in the chunk group CG collectively in the storage area to release the storage area of invalid chunks (chunks with the number of references being "0").

The Bloom filter BF3-1-1 illustrated in FIG. 8 is a Bloom filter using the entire bit array BA3-1-1 illustrated in FIG. 6, and is used to search the chunk group CG (the search table TB1-1). The Bloom filter BF2-1 illustrated in FIG. 8 is a Bloom filter using the entire bit array BA2-1 illustrated in FIG. 6, and the Bloom filter BF1 illustrated in FIG. 8 is a Bloom filter using the entire bit array BA1 illustrated in FIG. 6.

In FIG. 8, as an example, it is assumed that the number of chunks contained in the chunk group CG has been reduced to ⅓ by the defragmentation processing. In this case, among the Bloom filters in the lowest level (the third level) in the hierarchical Bloom filter, the number of bits of the Bloom filter BF3-1-1 having the chunk group CG (the search table TB1-1) as the search target is reduced. In this processing, in the Bloom filter BF3-1-1, the bit array of ⅓ of those on the lower side is left as it is, while the bit array of the remaining ⅔ on the higher side is deleted from the storage area. It is assumed that a bit array having m bits has been deleted from the Bloom filter BF3-1-1 at this time.

Next, the number of bits of the Bloom filter BF2-1 located above the Bloom filter BF3-1-1 is reduced. In this processing, in the Bloom filter BF2-1, the bit array having m bits on the higher side is deleted from the storage area, while the remaining bit array is left as it is. The number of bits is not reduced for the other Bloom filters in the second level.

Next, the number of bits of the Bloom filter BF1 located above the Bloom filter BF2-1 is reduced. In this processing, like the second level, in the Bloom filter BF1, the bit array having m bits on the higher side is deleted from the storage area, while the remaining bit array is left as it is.

By the above-described procedure, the storage area of the hierarchical Bloom filter is also reduced in accordance with the reduction of the storage area of the chunk group CG.

FIG. 9 is a diagram illustrating a comparative example of the search processing using a Bloom filter in which the number of bits has been reduced. FIG. 9 illustrates the case where search for a chunk CK1 divided from a file is requested in the state where the number of bits of each of the Bloom filters BF1, BF2-1, and BF3-1-1 has been reduced by the procedure as illustrated in FIG. 8.

In this case, first, the presence or absence of the chunk CK1 is determined by using the Bloom filter BF1 in the first level. At this time, a bit array BS1 having the same number of m bits as the reduced number of bits is virtually added to the level above the Bloom filter BF1. In the bit array BS1 added, all the bit values are set to "1". It is then determined whether the chunk CK1 is contained in the chunk group to be the search target by using the Bloom filter BF1 to which the bit array BS1 has been added.

When it is determined by this determination that there is a possibility that the chunk CK1 is contained in the chunk group to be the search target, the presence or absence of the chunk CK1 is determined by using each of the Bloom filters (corresponding to the bit array BA2-1, BA2-2, . . . , BA2-*d*) in the second level. In the processing using the Bloom filter BF2-1, a bit array BS2 having the same number of m bits as the reduced number of bits is virtually added to the level above the Bloom filter BF2-1. Like the bit array BS1, in the bit array BS2 added, all the bit values are set to "1". It is then determined whether the chunk CK1 is contained in the chunk group to be the search target by using the Bloom filter BF2-1 to which the bit array BS2 has been added.

It is assumed that it is determined by the determination processing using the Bloom filter BF2-1 that there is a possibility that the chunk CK1 is contained in the chunk group to be the search target. In this case, next, the presence or absence of the chunk CK1 is determined by using each of the Bloom filters (corresponding to the bit arrays BA3-1-1, BA3-1-2, . . . , BA3-1-*d*) placed in the level below the Bloom filter BF2-1. In the processing using the Bloom filter BF3-1-1, a bit array BS3 having the same number of m bits as the reduced number of bits is virtually added to the level above the Bloom filter BF3-1-1. Uke the bit arrays BS1 and BS2, in the bit array BS3 added, all the bit values are set to "1". It is then determined whether the chunk CK1 is contained in the chunk group CG to be the search target by using the Bloom filter BF3-1-1 to which the bit array BS3 has been added.

In the above-described comparative example, when the search is conducted by using a Bloom filter from which the number of bits has been reduced, a bit array that has the same number of bits as the reduced number of bits and in which the values of all the bits are "1" is virtually added to the level above the Bloom filter. The search is conducted by using the Bloom filter to which the bit array has been added as described above. In this way, it is possible to suppress an occurrence of significant erroneous determination in the search processing (specifically, for example, determination that an element that is actually present in a set is not present) while reducing the amount of actual data of Bloom filters stored in a storage area to increase the use efficiency of the storage area.

In this comparative example, since the presence or absence is determined by temporarily adding a bit array in which all the bit values are "1", there is a problem that the probability of occurrence (false positive rate) of erroneous determination (specifically, for example, determination that an element that is actually present in a set is not present) due to false positive increases as compared with before reduction of bits.

For example, for the Bloom filter BF3-1-1 in the lowest level, a method of reducing the number of bits by regenerating the Bloom filter BF3-1-1 along with the reduction in the number of chunks in the chunk group CG to be the search target is conceivable. In this re-creation, a Bloom filter having a smaller number of bits than that of the original Bloom filter BF3-1-1 (a bit array in which all the bit values are "0" is generated. Hash calculations are conducted by k types of hash functions using a hash key for each of chunks remaining in the chunk group CG, and k bits in a new Bloom filter are set to "1".

Such regeneration makes it possible to reduce the number of bits without causing an increase in false positive rate, in view of the Bloom filter BF3-1-1 itself. However, even when the Bloom filter BF3-1-1 in the lowest level is regenerated, an increase in false positive rate in the Bloom filters in the higher level causes an increase in false positive rate in the Bloom filter BF3-1-1 in the lowest level as well.

To deal with such problem, the hierarchical Bloom filter 118 of the second embodiment has the following configuration. The bit array of each node in the hierarchical Bloom filter 118 is uniformly divided into the same number of bit arrays, and the bit arrays thus divided are utilized as individual Bloom filters, respectively. Each of the Bloom filters contained in one bit array is identified by an index.

A plurality of Bloom filters contained in the bit array of each node are used to search for hash keys classified based on different classification conditions, respectively. Specifically, for example, a certain Bloom filter is used to determine whether hash keys that match the same classification condition are present in a set of hash keys that match a certain classification condition. The same classification condition is associated with Bloom filters identified by the same index in a bit array. Once all the hash keys to be the search target for a certain Bloom filter are deleted, the Bloom filter is deleted from the bit array of the corresponding node. This makes it possible to achieve a reduction in the number of bits in the hierarchical Bloom filter 118.

In the case where among Bloom filters of the nodes located below the same higher node, all the Bloom filters identified by the same index are deleted, the Bloom filters identified by the same index in the higher node are also allowed to be deleted. In this way, the positions of Bloom filters that may be deleted are propagated from the lower level to the higher level.

Such a configuration makes it possible to delete the number of bits of the hierarchical Bloom filter 118 across Bloom filters in multiple levels without increasing the false positive rate.

Hereinafter, the detail of the hierarchical Bloom filter 118 of the second embodiment is described.

Figure 10:
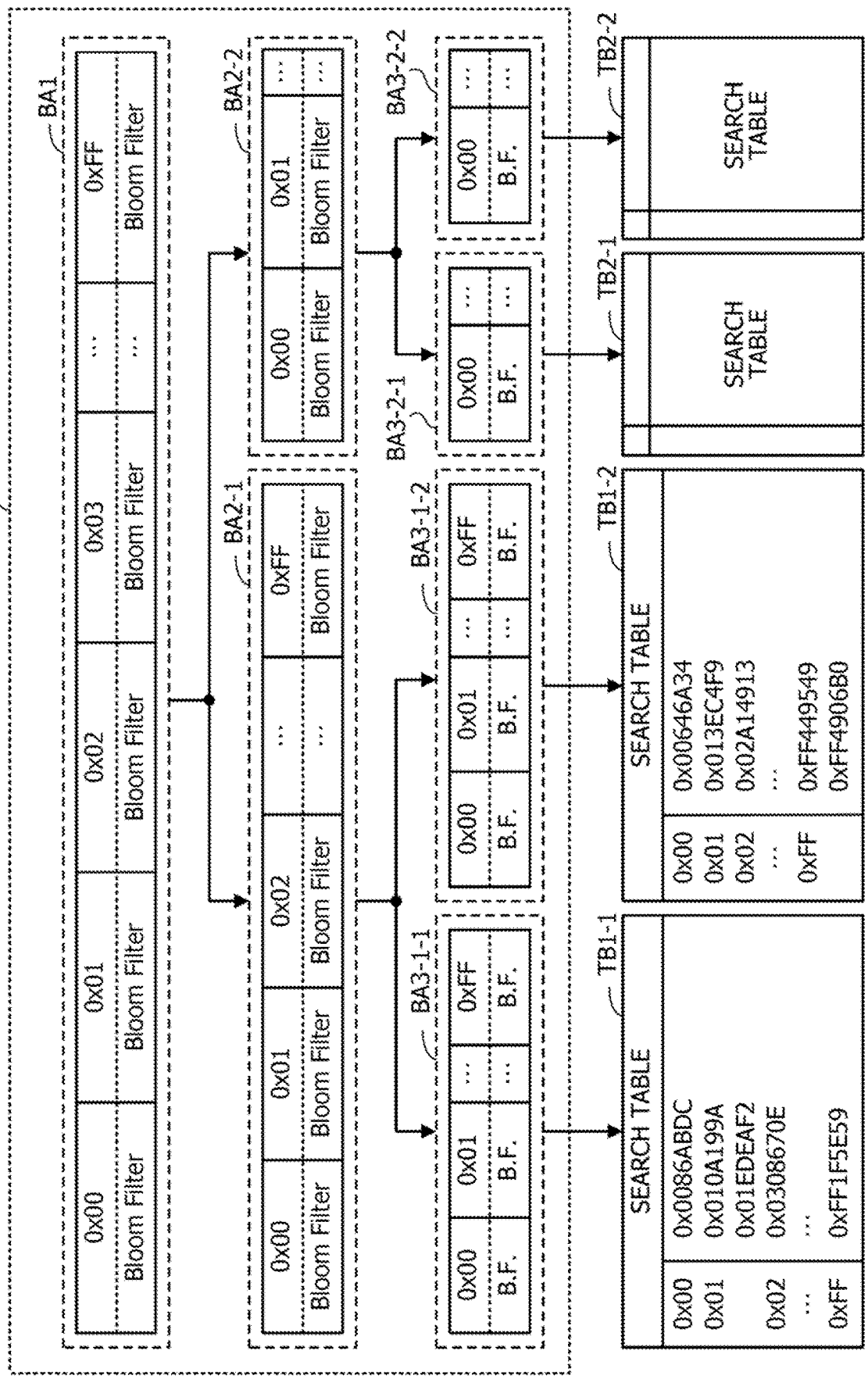
FIG. 10 is a diagram illustrating an internal configuration example of the hierarchical Bloom filter.

FIG. 10 is a diagram illustrating an internal configuration example of the hierarchical Bloom filter. In FIG. 10, for simplification of description, the number of virtual nodes coupled to one node is assumed to be "2" (specifically, for example, d=2).

As described above, the bit array of each node in the hierarchical Bloom filter 118 is uniformly divided into the same number of bit arrays, and the bit arrays thus divided are utilized as individual Bloom filters, respectively. Each of the Bloom filters contained in one bit array is identified by an index. In the example of FIG. 10, indices from "0x00" to "0xFF" are given to the Bloom filters in the bit arrays.

A plurality of Bloom filters contained in the bit array of each node are used to search for hash keys classified based on different classification conditions, respectively. Specifically, for example, the indices from "0x00" to "0xFF" are associated with mutually different classification conditions, respectively. In this embodiment, as an example, bit values of the high-order 1 byte among the bit values of a hash key are used as the classification condition. The values of the index is the same as the bit values of the classification condition such that the bloom filters with the index "0x00" is used to search for a hash key in which the high-order 1 byte is "0x00", and the bloom filters with the index "0x01" is used to search for a hash key in which the high-order 1 byte is "0x01".

The relationships between the Bloom filters and hash keys to be the search target are as described below, for example. In the third level (the lowest level), the search target of the Bloom filter of index "0x00" among the Bloom filters in the bit array BA3-1-1 is a hash key in which the high-order 1 byte is "0x00" among the hash keys registered in the search table TB1-1. The search target of the Bloom filter of index "0x01" among the Bloom filters in the bit array BA3-1-1 is a hash key in which the high-order 1 byte is "0x01" among the hash keys registered in the search table TB1-1.

In the second level, the search target of the Bloom filter of index "0x00" among the Bloom filters in the bit array BA2-1 is a hash key in which the high-order 1 byte is "0x00" among the hash keys registered in the search tables TB1-1 and TB1-2. The search target of the Bloom filter of index "0x01" among the Bloom filters in the bit array BA2-1 is a hash key in which the high-order 1 byte is "0x01" among the hash keys registered in the search tables TB1-1 and TB1-2.

In the first level, the search target of the Bloom filter of index "0x00" among the Bloom filters in the bit array BA1 is a hash key in which the high-order 1 byte is "0x00" among the hash keys registered in the search tables TB1-1, TB1-2, TB2-1, and TB2-2. The search target of the Bloom filter of index "0x01" among the Bloom filters in the bit array BA1 is a hash key in which the high-order 1 byte is "0x1" among the hash keys registered in the search tables TB1-1, TB1-2, TB2-1, and TB2-2.

Figure 11:
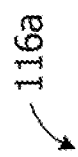
FIG. 11 is a diagram illustrating a configuration example of a filter management table.

FIG. 11 is a diagram illustrating a configuration example of a filter management table. In the Bloom filter data 116 in the storage unit 110, management information indicating the configuration of the hierarchical Bloom filter 118 and bit arrays which actually serve as the Bloom filters are registered. A filter management table 116a illustrated in FIG. 11 is an example of the former.

The filter management table 116a includes records of the respective nodes of the hierarchical Bloom filter 118. In each record, a node number for identifying the node is registered. In each record, filter addresses for the respective indices, a filter size indicating the size of the Bloom filter, child node numbers identifying child nodes placed in the level below the node are registered. The filter addresses indicate the start addresses of the bit arrays which actually serve as the Bloom filters corresponding to the indices in the storage unit 110. The filter address and the filter size allow for the access to the Bloom filter corresponding to the index. From the correspondences between the node numbers and the child node numbers, the tree structure of the hierarchical Bloom filter 118 is specified.

Figure 12:
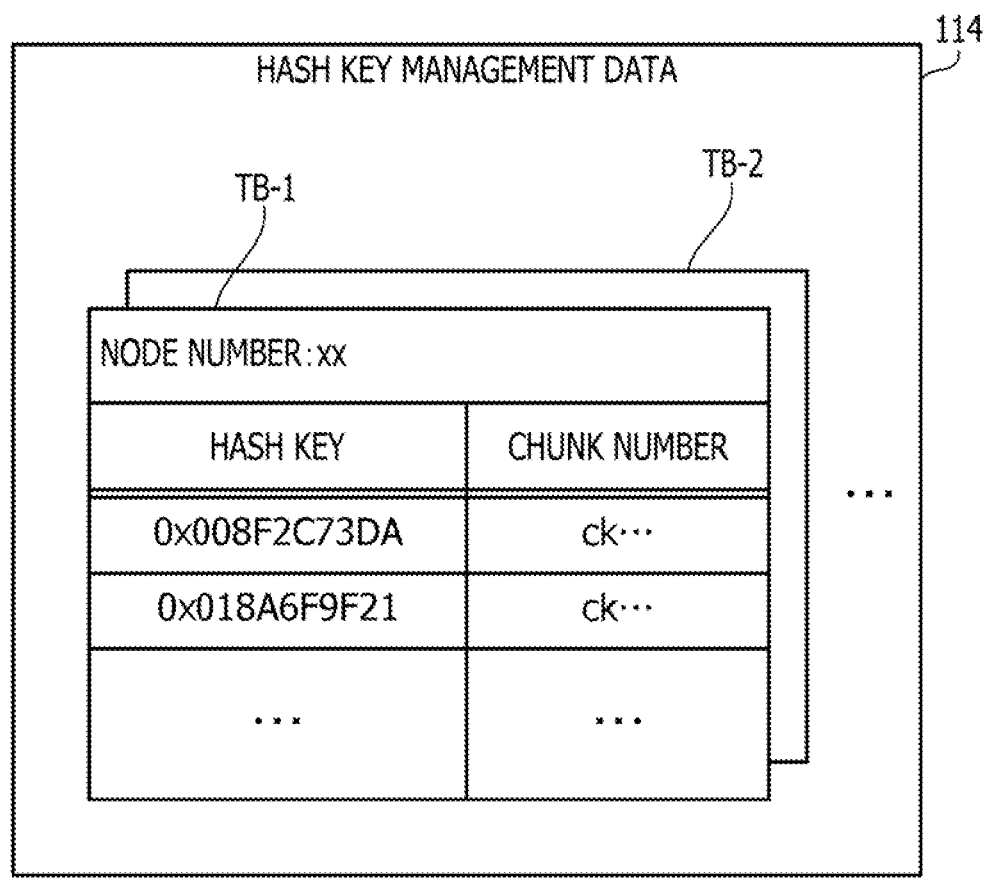
FIG. 12 is a diagram illustrating a configuration example of search tables.

FIG. 12 is a diagram illustrating a configuration example of the search tables. The search tables TB-1, TB-2, . . . are registered in the hash key management data 114. Each of the search tables TB-1, TB-2, . . . is assigned the node number indicating the node in the lowest level. In each of the search tables TB-1, TB-2, . . . , a hash key and a chunk number indicating the chunk based on which the hash key is calculated are registered. In each of the search tables TB-1, TB-2, . . . , a key-value database in which the hash keys serve as keys and the chunk numbers serve as values is formed.

Next, the processing using the hierarchical Bloom filter of this embodiment is described using FIGS. 13 to 16.

Figure 13:
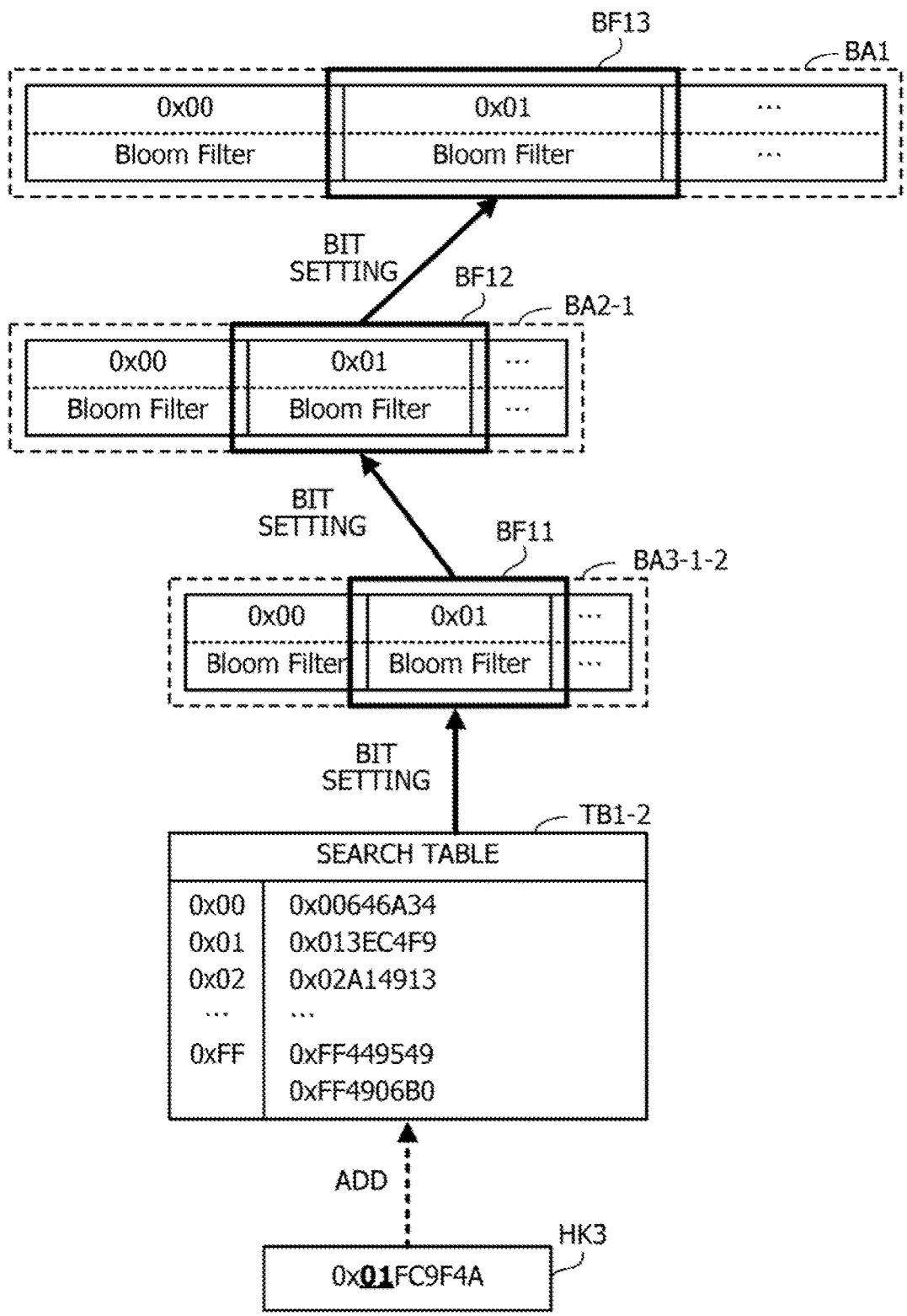
FIG. 13 is a diagram illustrating a processing example in a case where a hash key is added to a search table.

FIG. 13 is a diagram illustrating a processing example in a case where a hash key is added to a search table. FIG. 13 illustrates the case where a hash key HK3 is added to the search table TB1-2.

When the high-order 1 byte of the hash key HK3 is "0x01", the deduplication processing unit 130 determines that the index indicating the Bloom filter to be used is "0x01". The deduplication processing unit 130 first specifies the Bloom filter of index "0x01" (denoted by "BF11") from the bit array BA3-1-2 of the lowermost node having the search table TB1-2 as the search target.

The deduplication processing unit 130 conducts calculations using k types of hash functions on the hash key HK3 to calculate k hash values. The deduplication processing unit 130 divides each of the calculated k hash values by the number of bits of the specified Bloom filter BF11 and specifies k remainders obtained by the division as the bit numbers whose bit values are set to "1". The deduplication processing unit 130 sets the bits of the specified bit numbers to "1" among the bits of the Bloom filter BF11.

Next, the deduplication processing unit 130 refers to the bit array BA2-1 placed above the bit array BA3-1-2 and specifies the Bloom filter of index "0x01" (denoted by "BF12") from the bit array BA2-1. The deduplication processing unit 130 divides each of the k hash values calculated based on the hash key HK3 by the number of bits of the specified Bloom filter BF12 and specifies k remainders obtained by the division as the bit numbers whose bit values are set to "1". The deduplication processing unit 130 sets the bits of the specified bit numbers to "1" among the bits of the Bloom filter BF12.

Next, the deduplication processing unit 130 refers to the bit array BA1 placed above the bit array BA2-1 and specifies the Bloom filter of index "0x01" (denoted by "BF13") from the bit array BA1. The deduplication processing unit 130 divides each of the k hash values calculated based on the hash key HK3 by the number of bits of the specified Bloom filter BF13 and specifies k remainders obtained by the division as the bit numbers whose bit values are set to "1". The deduplication processing unit 130 sets the bits of the specified bit numbers to "1" among the bits of the Bloom filter BF13.

By such processing, the bit setting is conducted for the Bloom filters of the hierarchical Bloom filter 118.

Figure 14:
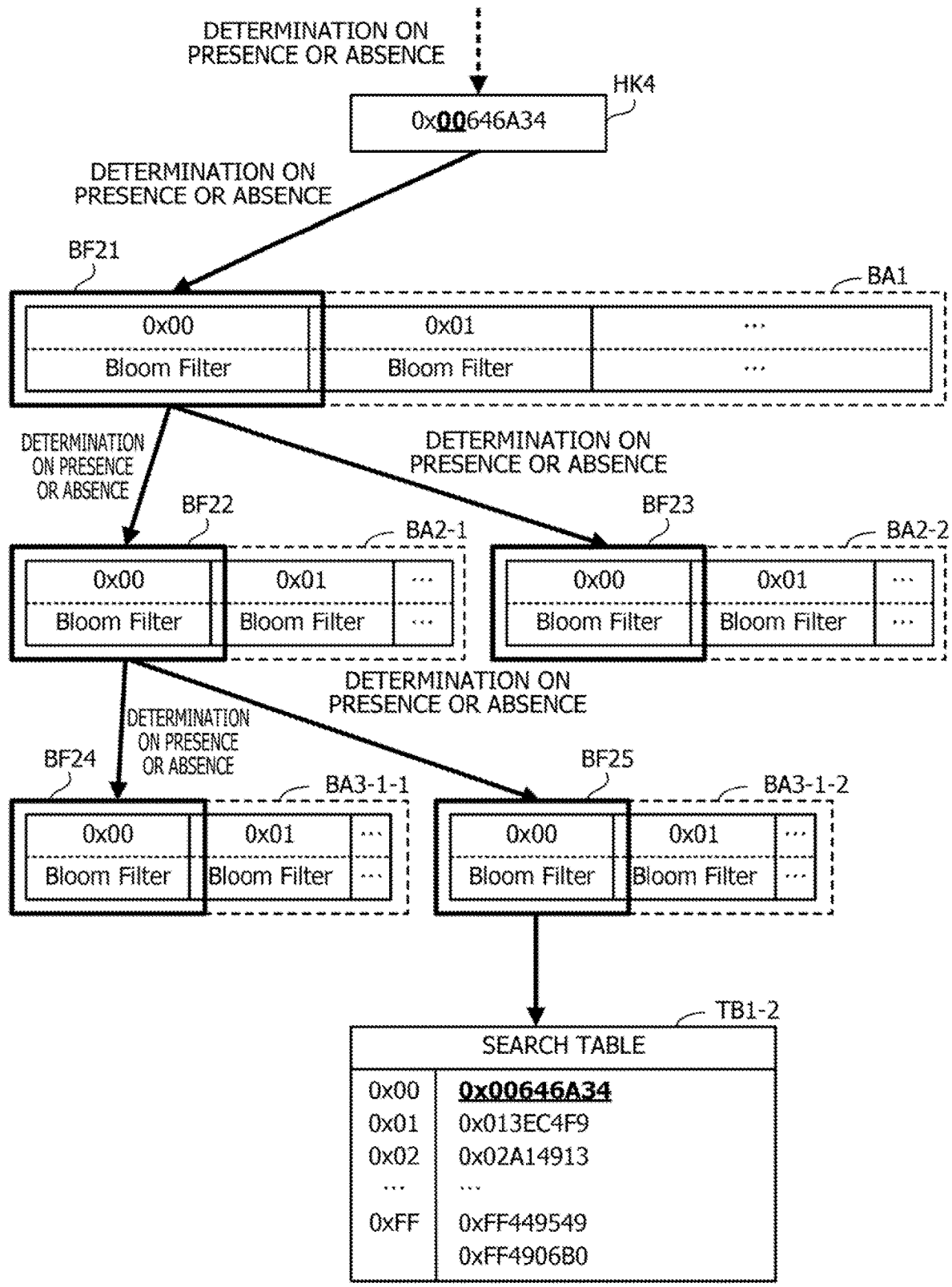
FIG. 14 is a diagram illustrating a processing example of determination on the presence or absence of a hash key.

FIG. 14 is a diagram illustrating a processing example of determination on the presence or absence of a hash key. FIG. 14 illustrates the case where the presence or absence of a hash key HK4 is determined.

When the high-order 1 byte of the hash key HK4 is "0x00", the deduplication processing unit 130 determines that the index indicating the Bloom filter to be used is "0x00". The deduplication processing unit 130 first specifies the Bloom filter of index "0x00" (denoted by "BF21") from the bit array BA1 of the highest node.

The deduplication processing unit 130 conducts calculations using k types of hash functions on the hash key HK4 to calculate k hash values. The deduplication processing unit 130 divides each of the calculated k hash values by the number of bits of the specified Bloom filter BF21 and specifies k remainders obtained by the division as the bit numbers to be compared.

The deduplication processing unit 130 acquires the bit values of the specified bit numbers from the Bloom filter BF21 and determines whether all the bit values are "1" or not. In the case where all the acquired bit values are "1", the deduplication processing unit 130 determines that a hash key having the same value as the hash key HK4 is present in any of the search tables TB1-1, TB-2, TB2-1, and TB2-2. In the case where even one of the acquired bit values is "0", the deduplication processing unit 130 determines that a hash key having the same value as the hash key HK4 is not present in any of the search tables TB1-1, TB1-2, TB2-1, and TB2-2.

In FIG. 14, it is assumed that all the acquired bit values are "1" as an example. In this case, the deduplication processing unit 130 specifies the Bloom filter of index "0x00" (denoted by "BF22") from the bit array BA2-1 of the lower node. Along with this, the deduplication processing unit 130 specifies the Bloom filter of index "0x00" (denoted by "BF23") from the bit array BA2-2 of the lower node. The deduplication processing unit 130 then determines the presence or absence by using the specified Bloom filters BF22 and BF23.

Specifically, for example, the deduplication processing unit 130 divides each of the k hash values calculated based on the hash key HK4 by the number of bits of the specified Bloom filter BF22 and specifies k hash values obtained by the division as the bit numbers to be compared. The deduplication processing unit 130 acquires the bit values of the specified bit numbers from the Bloom filter BF22 and determines whether all the bit values are "1" or not.

Along with this, the deduplication processing unit 130 divides each of the k hash values calculated based on the hash key HK4 by the number of bits of the specified Bloom filter BF23 and specifies k hash values obtained by the division as the bit numbers to be compared. The deduplication processing unit 130 acquires the bit values of the specified bit numbers from the Bloom filter BF23 and determines whether all the bit values are "1" or not.

In FIG. 14, it is assumed that all the bit values acquired from the Bloom filter BF22 are "1" as an example. In this case, it is determined that a hash key having the same value as the hash key HK4 is present in any of the search tables TB1-1 and TB1-2. The deduplication processing unit 130 specifies the Bloom filter of index "0x00" (denoted by "BF24") from the bit array BA3-1-1 of the lower node. Along with this, the deduplication processing unit 130 specifies the Bloom filter of index "0x00" (denoted by "BF25") from the bit array BA3-1-2 of the lower node. The deduplication processing unit 130 then determines the presence or absence by using the specified Bloom filters BF24 and BF25 in the same manner as described above.

In FIG. 14, it is assumed that all the bit values acquired from the Bloom filter BF25 are "1" as an example. In this case, it is determined that a hash key having the same value as the hash key HK4 is present in the search table TB1-2. In this way, the search range for the duplicated hash keys is narrowed to the search table TB1-2.

Figure 15:
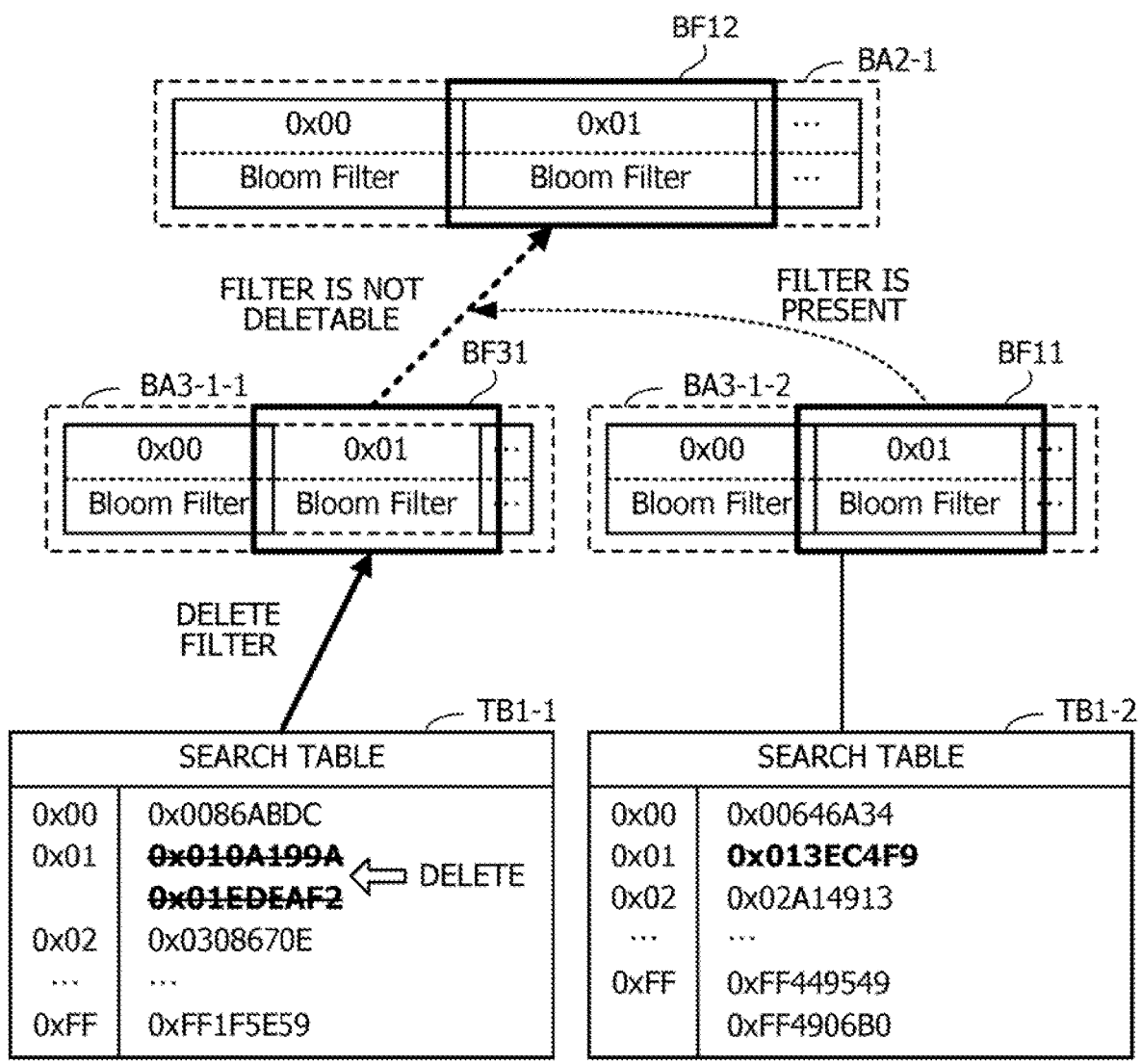
FIG. 15 is a diagram illustrating a first processing example at the time of deleting a chunk.

FIG. 15 is a diagram illustrating a first processing example at the time of deleting a chunk. In FIG. 15, it is assumed that all the hash keys in each of which the start 1 byte is "0x01" have been deleted among the hash keys registered in the search table TB1-1 by the execution of the defragmentation processing.

In this case, the deduplication processing unit 130 determines the index indicating the Bloom filter to be deleted as "0x01". The deduplication processing unit 130 then specifies the Bloom filter of index "0x01" (denoted by "BF31") from the bit array BA3-1-1 of the lowest node having the search table TB1-1 as the search target. In this way, the number of bits in the hierarchical Bloom filter 118 is reduced.

Next, the deduplication processing unit 130 refers to the other bit array BA3-1-2 having the same parent node (the bit array BA2-1 of the higher node) as the bit array BA3-1-1 and determines whether the Bloom filter of index "0x01" is present. In the example of FIG. 15, since the Bloom filter BF11 with the index "0x01" is present in the bit array 3-1-2, the deduplication processing unit 130 ends the bit reduction processing.

Figure 16:
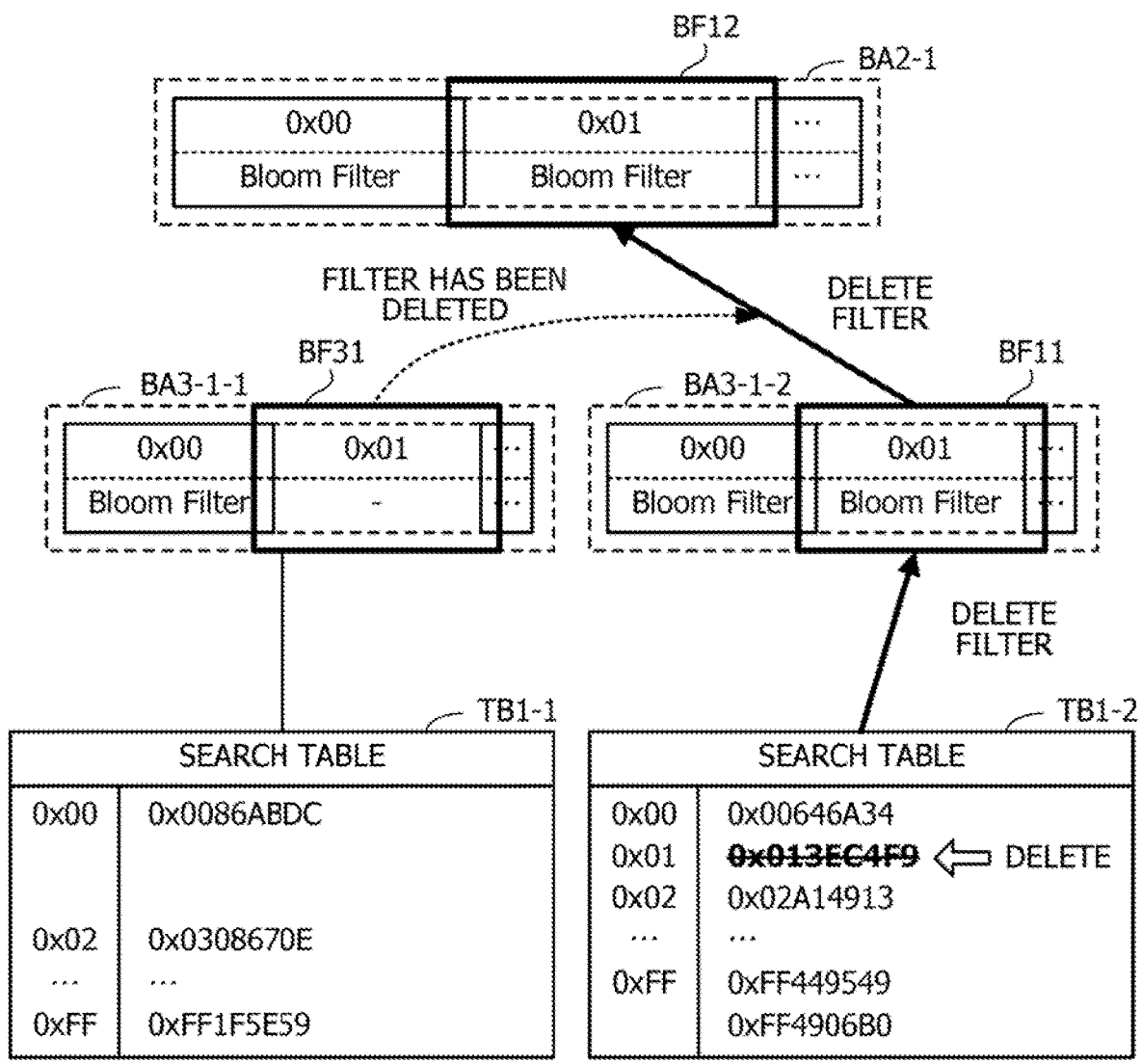
FIG. 16 is a diagram illustrating a second processing example at the time of deleting a chunk.

FIG. 16 is a diagram illustrating a second processing example at the time of deleting a chunk. In FIG. 16, it is assumed that all the hash keys in each of which the start 1 byte is "0x01" have been deleted among the hash keys registered in the search table TB1-2 by the execution of the defragmentation processing from the state where the bit reduction has been conducted as in FIG. 15.

In this case, the deduplication processing unit 130 determines the index indicating the Bloom filter to be deleted as "0x01". The deduplication processing unit 130 then deletes the Bloom filter BF11 with the index "0x01" from the bit array BA3-1-2 of the lowest node having the search table TB1-2 as the search target. In this way, the number of bits in the hierarchical Bloom filter 118 is reduced.

Next, the deduplication processing unit 130 refers to the other bit array BA3-1-1 having the same parent node (the bit array BA2-1 of the higher node) as the bit array BA3-1-2 and determines whether the Bloom filter of index "0x01" is present. In the example of FIG. 16, in the bit array BA3-1-1, the Bloom filter BF31 with the index "0x01" has already been deleted. In this case, the deduplication processing unit 130 deletes the Bloom filter BF12 with the index "0x01" from the bit array BA2-1 of the higher node. In this way, the position of the Bloom filter that may be deleted is propagated from the lower level to the higher level, allowing the number of bits of the hierarchical Bloom filter 118 to be deleted across the Bloom filters in multiple levels.

Even when the Bloom filter is deleted, the false positive rate does not change. For example, it is assumed that the presence or absence of a hash key in which the first 1 byte is "0x01" (referred to as "inputted hash key") is determined after the Bloom filter BF31 is deleted as in FIG. 15. It is also assumed that the presence or absence is determined by using the bit array BA3-1-1 based on the result of determination in the higher node. In this case, since the Bloom filter BF31 with the index "0x01" is not present in the bit array BA3-1-1, the deduplication processing unit 130 determines that a hash key having the same value as the inputted hash key is not present in the search table TB1-1.

In this state, even when an inputted hash key in which the first 1 byte is other than "0x01" is inputted and the presence or absence is determined by using the bit array BA3-1-1, the presence or absence is determined regardless of the deletion of the Bloom filter BF31. Hence, also in the determination on the presence or absence in all the nodes of the hierarchical Bloom filter 118 including the node of the bit array BA3-1-1 from which the Bloom filter BF31 has been deleted, the false positive rate does not change from before the deletion of the Bloom filter BF31.

For example, it is assumed that the presence or absence of an inputted hash key in which the first 1 byte is "0x01" is determined after the Bloom filters BF11 and BF12 are deleted as in FIG. 16. It is also assumed that the presence or absence is determined by using the bit array BA2-1 based on the result of determination in the higher node. In this case, since the Bloom filter BF12 with the index "0x01" is not present in the bit array BA2-1, the deduplication processing unit 130 determines that a hash key having the same value as the inputted hash key is not present in either of the search tables TB1-1 and TB1-2.

In this state, even when an inputted hash key in which the first 1 byte is other than "0x01" is inputted and the presence or absence is determined by using the bit array BA2-1, the presence or absence is determined regardless of the deletion of the Bloom filter BF12. Hence, also in the determination on the presence or absence in all the nodes of the hierarchical Bloom filter 118 including the node of the bit array BA2-1 from which the Bloom filter BF12 has been deleted, the false positive rate does not change from before the deletion of the Bloom filter BF12.

In this way, even when a Bloom filter forming a bit array of part of each node is deleted, the false positive rate in determination on the presence or absence in any node of the hierarchical Bloom filter 118 does not change. For this reason, the false positive rate in the entire hierarchical Bloom filter 118 does not change. Hence, it is possible to delete the number of bits of the hierarchical Bloom filter 118 across Bloom filters in multiple levels without increasing the false positive rate.

The classification condition for determining an index of a Bloom filter to be used in determination on the presence or absence is not limited to the method using the value of the first 1 byte of a hash key as described above. For example, various classification conditions depending on the value or attribute of a hash key or a corresponding chunk may be used. For example, a bit value in not only the higher 1 byte but also within another predetermined range (such as the lower 1 byte) in a bit array of a hash key may be used as a classification condition. In this case, the value of an index may be the same as the bit value used as the classification condition, the processing to specify an index based on a hash key is facilitated.

For example, a bit value within a predetermined range in a bit array of a chunk from which a hash key is calculated may be used as a classification condition. As an example using the attribute of a hash key or a chunk, in the case where the writing of files belonging to multiple logical storage areas is requested from the NAS client 210, the identification number of the logical storage area to which the file from which a chunk is divided belongs may be used as a classification condition.

Next, the processing of the cloud storage gateway 100 is described using flowcharts.

Figure 17:
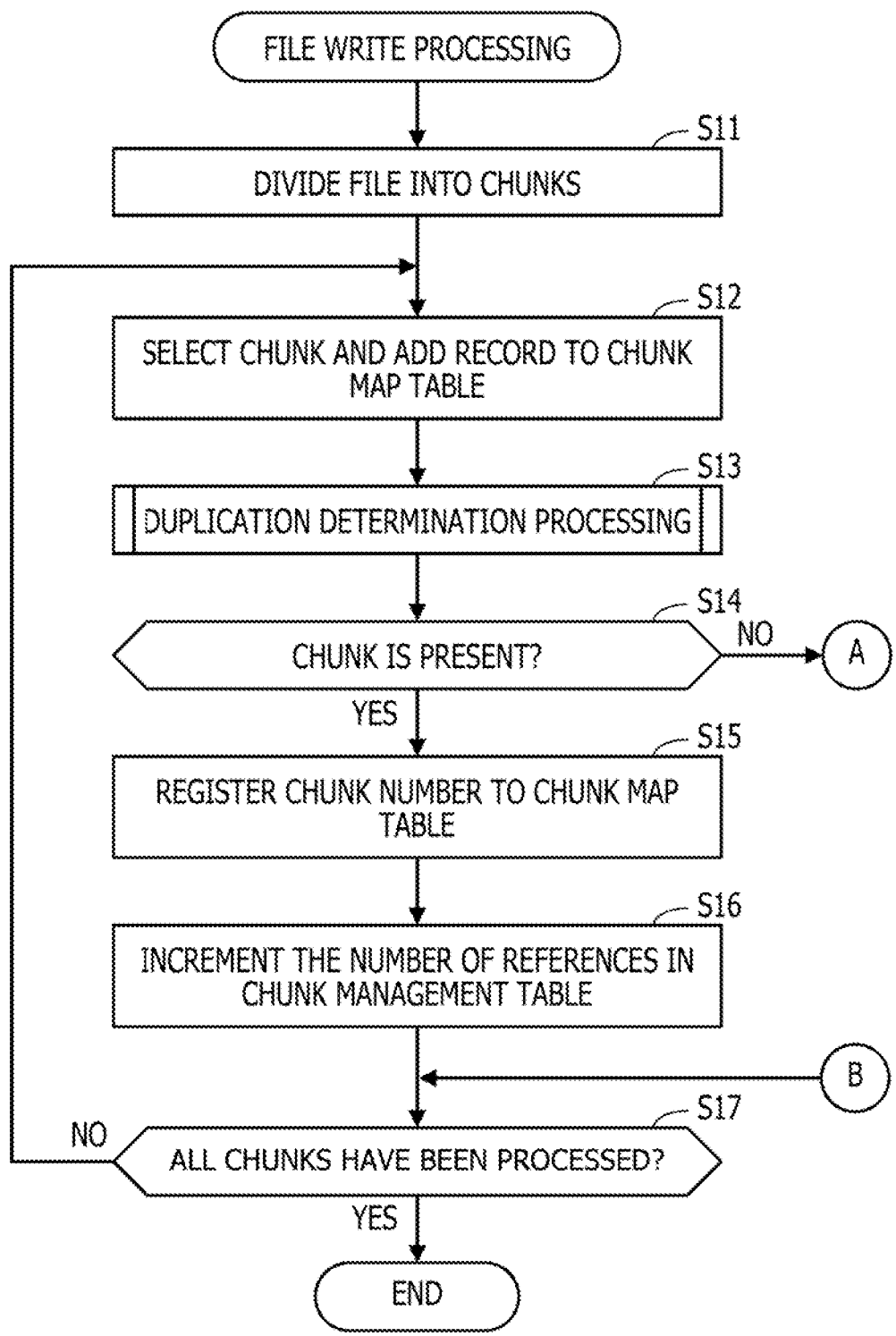
FIG. 17 is an example of a flowchart (1) illustrating a procedure of file write processing.
Figure 18:
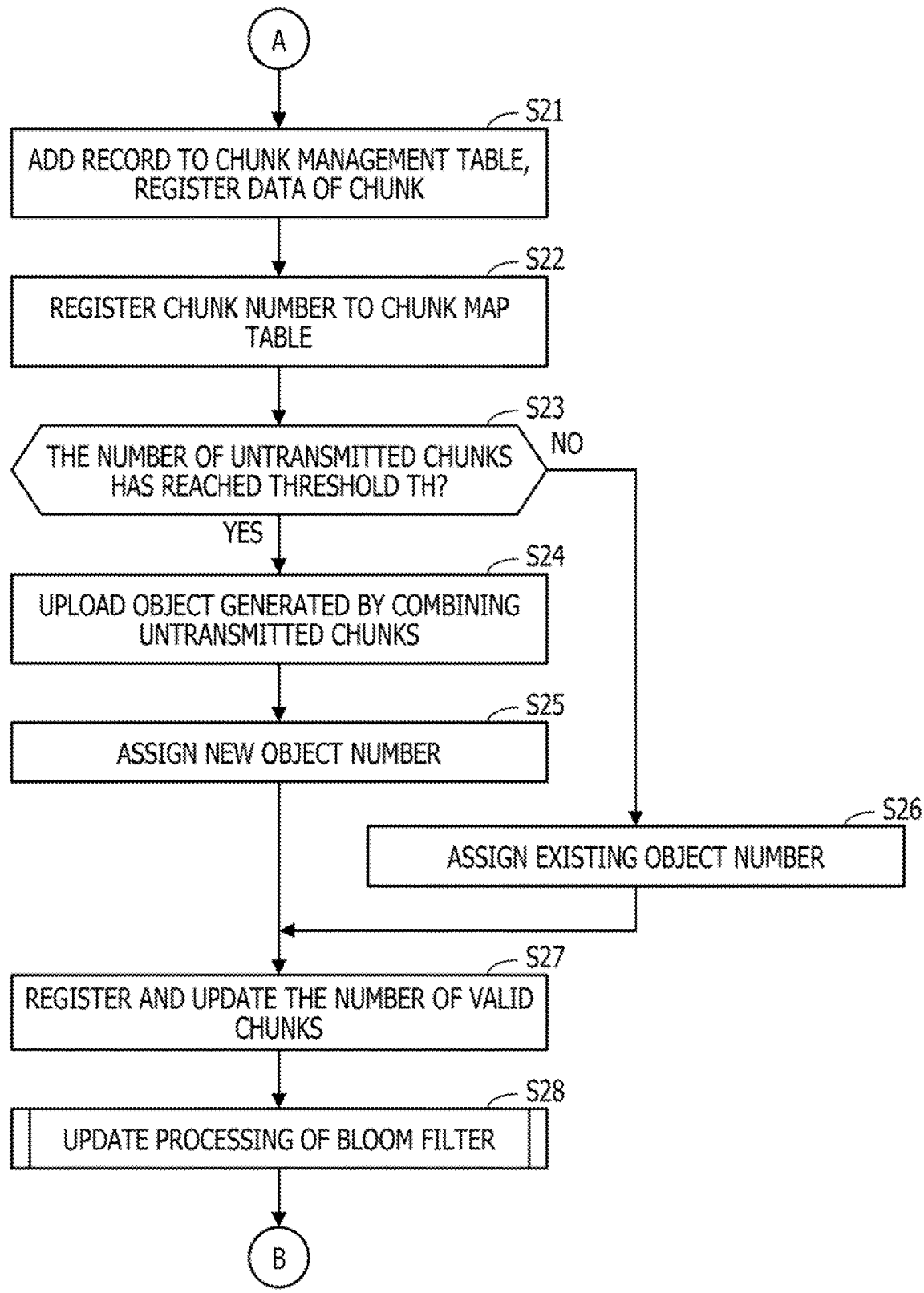
FIG. 18 is an example of a flowchart (2) illustrating a procedure of file write processing.

FIGS. 17 and 18 are examples of flowcharts illustrating the procedure of file write processing.

[Step S11] The file input/output unit 120 receives a file write request and file data from the NAS client 210. The duplication determination unit 131 of the deduplication processing unit 130 acquires data of the file for which the write request is made, and adds a record indicating directory information of the file to the directory table 111. At this time, a file number is added to the file. The duplication determination unit 131 divides the file data into chunks of variable length.

[Step S12] The duplication determination unit 131 selects one chunk to be the processing target in the order from the start of a file. The duplication determination unit 131 adds a record to the chunk map table 112, and registers the following information in the record. The file number of the file for which the write request is made is registered in the item of file number, and information about the chunk to be the processing target is registered in the items of offset and size.

[Step S13] The duplication determination unit 131 executes duplication determination processing. In this duplication determination processing, it is determined whether the chunk having the same contents as the chunk selected in step S12 has been stored (whether it is duplicated). The duplication determination processing is described in detail later with reference to FIG. 19.

[Step S14] The duplication determination unit 131 acquires the result of determination in the duplication determination processing in step S13. In the case where it is determined in the duplication determination processing that the chunk having the same contents as the chunk selected in step S12 has been stored (duplicated), the duplication determination unit 131 moves the processing to step S15, while in the case where it is determined that the chunk having the same contents as the chunk selected in step S12 has not been stored (not duplicated), the duplication determination unit 131 moves the processing to step S21 in FIG. 18.

[Step S15] The duplication determination unit 131 registers the chunk number of the stored chunk which has been determined to be duplicated in the duplication determination processing of step S13 in the record added to the chunk map table 112 in step S12.

[Step S16] The duplication determination unit 131 refers to the record containing the chunk number added in step S16 among records in the chunk management table 113, and increments the number of references registered in the record.

[Step S17] The duplication determination unit 131 determines whether or not all the chunks divided in step S11 have been processed. The duplication determination unit 131 moves the processing to step S12 when any unprocessed chunk is present, and selects one unprocessed chunk from the start and continues the processing. On the other hand, when all chunks have been processed, the duplication determination unit 131 notifies the file input/output unit 120 of the completion of file write. The notified file input/output unit 120 received the notification transmits response information indicating the completion of file write to the NAS client 210.

Hereinafter, the description continues with reference to FIG. 18.

[Step S21] The duplication determination unit 131 calculates a new chunk number for the chunk selected in step S12. This chunk number is a value obtained by adding "1" to a maximum value of the chunk number registered in the chunk management table 113. The duplication determination unit 131 adds a new record to the chunk management table 113, and registers the calculated new chunk number, chunk size, and the number of references "1" in the record.

The duplication determination unit 131 stores data of the chunk selected in step S12 in the data cache 117. At this time, the data storage position is associated with the chunk number.

[Step S22] The duplication determination unit 131 registers the new chunk number calculated in step S21 in the record added to the chunk map table 112 in step S12.

[Step S23] The chunk management unit 132 determines whether or not the number of untransmitted chunks to the cloud storage 240 has reached a predetermined threshold (TH). The number of untransmitted chunks is the number of chunks contained in the active object. The threshold TH is set to, for example, about 10000. The chunk management unit 132 moves the processing to step S24 when the number of untransmitted chunks has reached the threshold TH, and moves the processing to step S26 when the number of untransmitted chunks has not reached the threshold TH.

[Step S24] The chunk management unit 132 requests the cloud communication unit 140 to upload the object generated by combining TH untransmitted chunks to the cloud storage 240. Thereby, the concerned object is made inactive. The cloud communication unit 140 uploads the object to the cloud storage 240 according to the PUT command.

[Step S25] The chunk management unit 132 assigns a new object number to the chunk selected in step S12. This object number is a value obtained by adding "1" to the object number of the object uploaded in step S24. The chunk management unit 132 registers the new object number and the offset "0" in the record added to the chunk management table 113 in Step S21. The object corresponding to the new object number is made active. The chunk management unit 132 adds a new record to the object management table 115, and registers the new object number in this record.

[Step S26] The chunk management unit 132 assigns the existing maximum object number to the chunk selected in step S12. This object number is the object number assigned to the untransmitted chunk to be determined in step S23. In step S26, the chunk selected in step S12 is further assigned to the untransmitted object assigned to these chunks (active object).

The chunk management unit 132 registers the assigned object number and the offset in the corresponding object in the record added to the chunk management table 113 in step S21. The registered offset is calculated based on the offset and size that are registered in the previous record.

[Step S27] The chunk management unit 132 registers or updates the number of valid chunks in the object management table 115. Upon completion of step S25, the chunk management unit 132 registers TH as the number of valid chunks in the record added to the object management table 115 in step S25. On the other hand, when step S26 has been executed, the chunk management unit 132 identifies the record containing the object number assigned in step S26 from the object management table 115, and adds TH to the number of valid chunks registered in the identified record.

[Step S28] The chunk management unit 132 executes the update processing of the Bloom filters. In this processing, the bit setting is conducted for Bloom filters related to a newly registered chunk among the Bloom filters contained in the hierarchical Bloom filter 118. The update processing of the Bloom filters is described in detail later with reference to FIG. 20.

Upon completion of the above processing in step S28, the processing proceeds to step S17 in FIG. 17.

Figure 19:
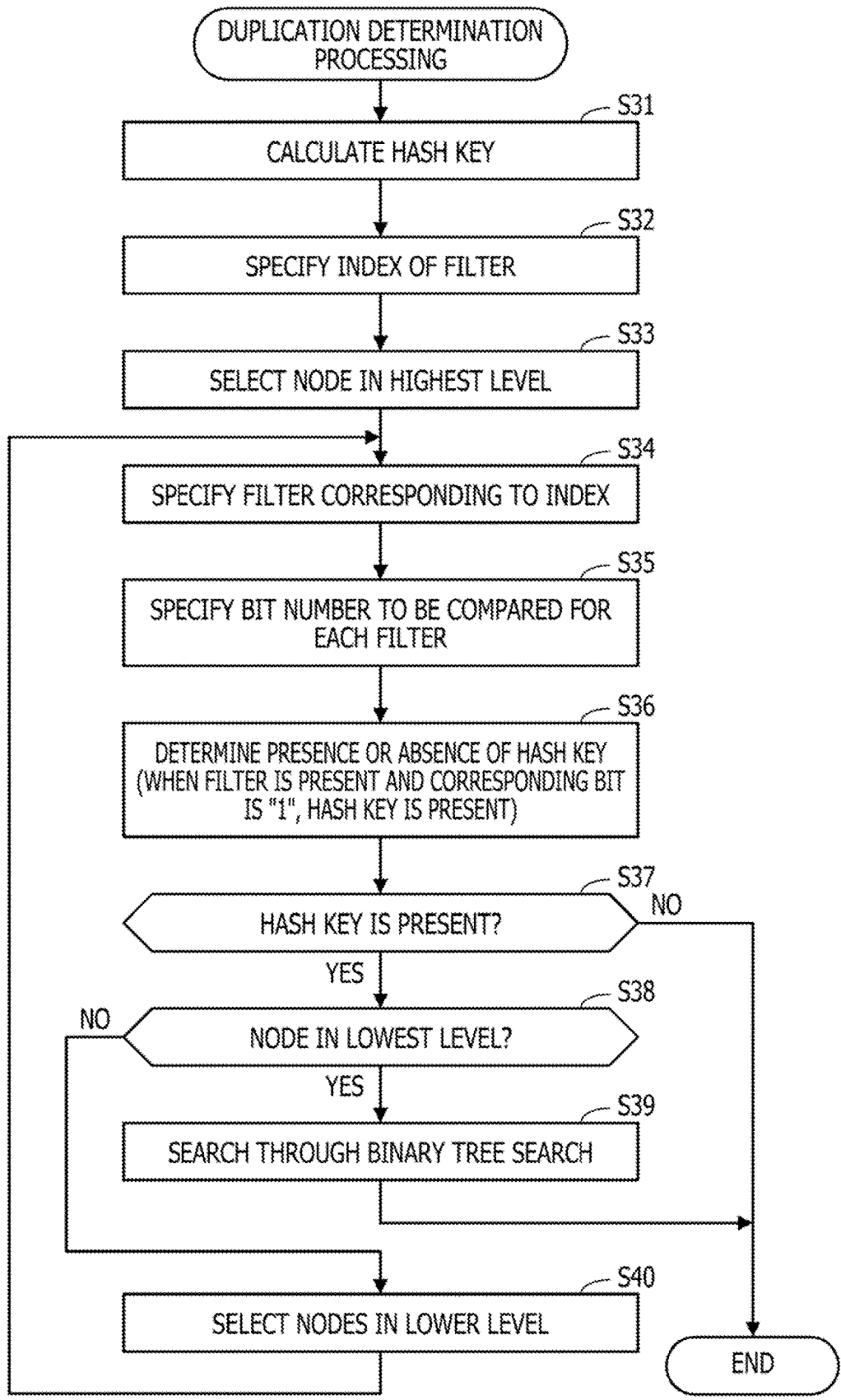
FIG. 19 is an example of a flowchart illustrating a procedure of a duplication determination processing.

FIG. 19 is an example of a flowchart illustrating a procedure of a duplication determination processing. The processing of FIG. 19 corresponds to the processing of step S13 in FIG. 17.

[Step S31] The duplication determination unit 131 calculates a new hash key based on the chunk selected in step S12 in FIG. 17.

[Step S32] The Bloom filter processing unit 131a specifies an index of the Bloom filter to be used in the duplication determination based on the calculated hash key. For example, as in the example of FIGS. 13 to 16, the value of the high-order 1 byte of the hash key is specified as the value of the index.

[Step S33] The Bloom filter processing unit 131a selects the highest node in the hierarchical Bloom filter 118 as the processing target based on the Bloom filter data 116.

[Step S34] The Bloom filter processing unit 131a specifies the bit array of the node selected in step S33 or step S40 executed immediately before. After step S40, since a plurality of nodes are selected, the bit arrays corresponding to the respective nodes are specified. The Bloom filter processing unit 131a specifies the Bloom filter corresponding to the index specified in step S32 from the bit arrays specified. At this time, the range of the bit array of the Bloom filter in the storage unit 110 is specified based on the filter management table 116a.

[Step S35] The Bloom filter processing unit 131a specifies the bit number to be compared for each Bloom filter specified in step S34. For example, the Bloom filter processing unit 131a conducts calculations using k types of hash functions on the hash key calculated in step S31 to calculate k hash values. The Bloom filter processing unit 131a divides each of the calculated k hash values by the number of bits of the Bloom filter for each Bloom filter and specifies k remainders obtained by the division as the bit numbers to be compared.

[Step S36] The Bloom filter processing unit 131a determines the presence or absence of the hash key calculated in step S31 by using each Bloom filter specified in step S34. For example, in the case where the corresponding Bloom filter is not present in the bit array of the selected node, it is determined that hash keys having the same value are not present in the search table below the Bloom filter. In the case where the corresponding Bloom filter is present, when all the bit values of the respective bit numbers specified in step S35 are "1", it is determined that hash keys having the same value are present in the search table below the Bloom filter. In the case where the corresponding Bloom filter is present, when even one of the bit values of the respective bit numbers specified in step S35 is "0", it is determined that hash keys having the same value are not present in the search table below the Bloom filter.

[Step S37] In the case where it is determined that hash keys are present based on any one of the Bloom filters in the determination on the presence or absence in step S36, the Bloom filter processing unit 131a moves the processing to step S38. On the other hand, in the case where it is determined that hash keys are not present in the determination on the presence or absence by using any of the Bloom filters in step S36, the Bloom filter processing unit 131a ends the duplication determination processing and moves the processing to step S14 in FIG. 17. In the latter case, it is determined that the chunk having the same value as the chunk selected in step S12 has not been stored (not duplicated).

[Step S38] The Bloom filter processing unit 131a determines whether the node to be the current processing target is a node in the lowest level in the hierarchical Bloom filter 118. The Bloom filter processing unit 131a moves the processing to step S39 in the case where the node is a node in the lowest level, and moves the processing to step S40 in the case where the node is not.

[Step S39] The binary tree search processing unit 131b specifies the search table associated with the Bloom filter in which it is determined that a hash key is present in step S36. From hash keys that match the classification condition which the hash key calculated in step S31 matches as search targets among the hash keys registered in the specified search table, the binary tree search processing unit 131b searches for a hash key having the same value as the calculated hash key through binary tree search. Specifically, for example, in the processing up to step S38, the search range is narrowed to the range of the specified search table by the processing using the hierarchical Bloom filter 118, and in step S39, the search is conducted on the narrowed search range through the binary tree search.

In the case where a hash key having the same value as the calculated hash key is specified by the search in step S39, the chunk number of the chunk corresponding to the specified hash key is outputted, and it is determined that the chunk having the same value as the chunk selected in step S12 has been stored (duplicated). On the other hand, in the case where a hash key having the same value as the calculated hash key is not specified, it is determined that the chunk having the same value as the chunk selected in step S12 has not been stored (not duplicated). Upon completion of step S39, the deduplication processing is ended and the processing proceeds to step S14 in FIG. 17.

[Step S40] The Bloom filter processing unit 131a selects all the nodes placed below the node to which the Bloom filter in which it is determined that a hash key is present in step S36 belongs as processing targets and moves the processing to step S34.

Figure 20:
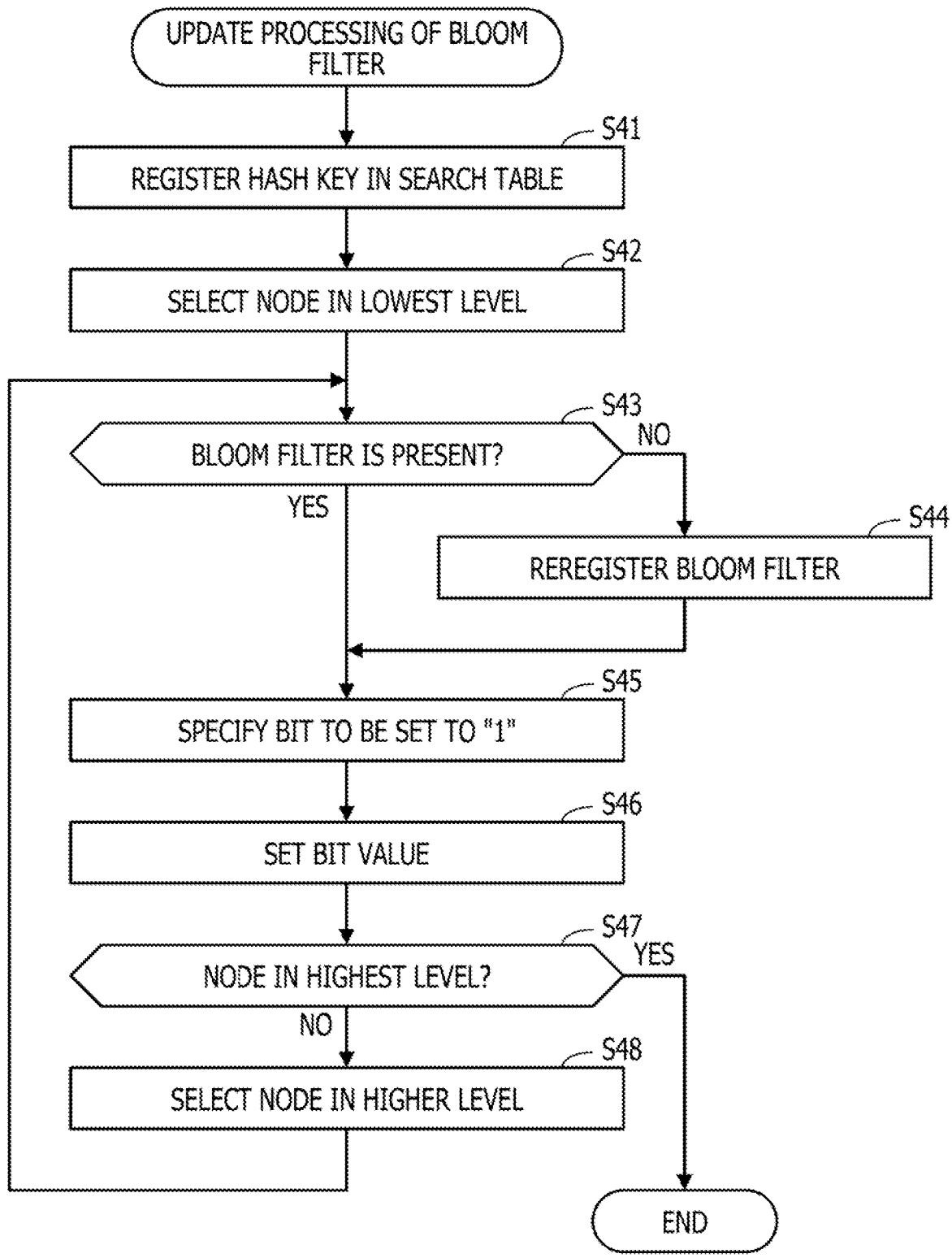
FIG. 20 is an example of a flowchart illustrating a procedure of update processing for a Bloom filter.

FIG. 20 is an example of a flowchart illustrating a procedure of update processing for a Bloom filter. The processing of FIG. 20 corresponds to the processing of step S28 in FIG. 18.

[Step S41] The chunk management unit 132 specifies a search table in which the hash key calculated in step S31 in FIG. 19 is to be registered, and registers the hash key in the specified search table.

[Step S42] The chunk management unit 132 selects a node associated with the search table in which the hash key has been registered as the processing target from the nodes in the lowest level in the hierarchical Bloom filter 118.

[Step S43] The chunk management unit 132 specifies the bit array of the node selected as the processing target in step S42 or step S48 immediately before, and determines whether the Bloom filter to be used is present in the specified bit array. The Bloom filter to be used is a Bloom filter corresponding to the index specified from the hash key registered in the search table. The presence or absence of the Bloom filter to be used is determined from whether the filter address corresponding to the index has been registered in the record corresponding to the node to be the processing target in the filter management table 116a. The chunk management unit 132 moves the processing to step S45 in the case where the Bloom filter to be used is present, and moves the processing to step S44 in the case where the Bloom filter is not present.

[Step S44] The chunk management unit 132 reregisters the Bloom filter to be used. In this processing, the bit array indicating the Bloom filter is stored in the storage unit 110, and the start address of the storage area of the bit array is registered in the corresponding item of the filter management table 116*a*. The bit value of each bit of the reregistered Bloom filter is set to the initial value "0".

[Step S45] The chunk management unit 132 specifies the bit number of the bit to be set to "1" among the bits of the Bloom filter to be used. In this processing, calculations using k types of hash functions are conducted on the hash key registered in the search table to calculate k hash values. Each of the k hash values calculated is divided by the number of bits of the Bloom filter to be used, and k remainders obtained by the division are specified as bit numbers to be set to "1".

[Step S46] The chunk management unit 132 sets the value of the specified bit number to "1" among the bits of the Bloom filter to be used.

[Step S47] The chunk management unit 132 determines whether the node to be the current processing target is a node in the highest level in the hierarchical Bloom filter 118. The chunk management unit 132 moves the processing to step S48 in the case where the node is not a node in the highest level, and ends the update processing for the Bloom filter and moves the processing to step S17 in FIG. 17 in the case where the node is a node in the highest level.

[Step S48] The chunk management unit 132 selects a node in the level higher than the node to which the Bloom filter to be used belongs as the processing target. Thereafter, the processing proceeds to step S43.

Figure 21:
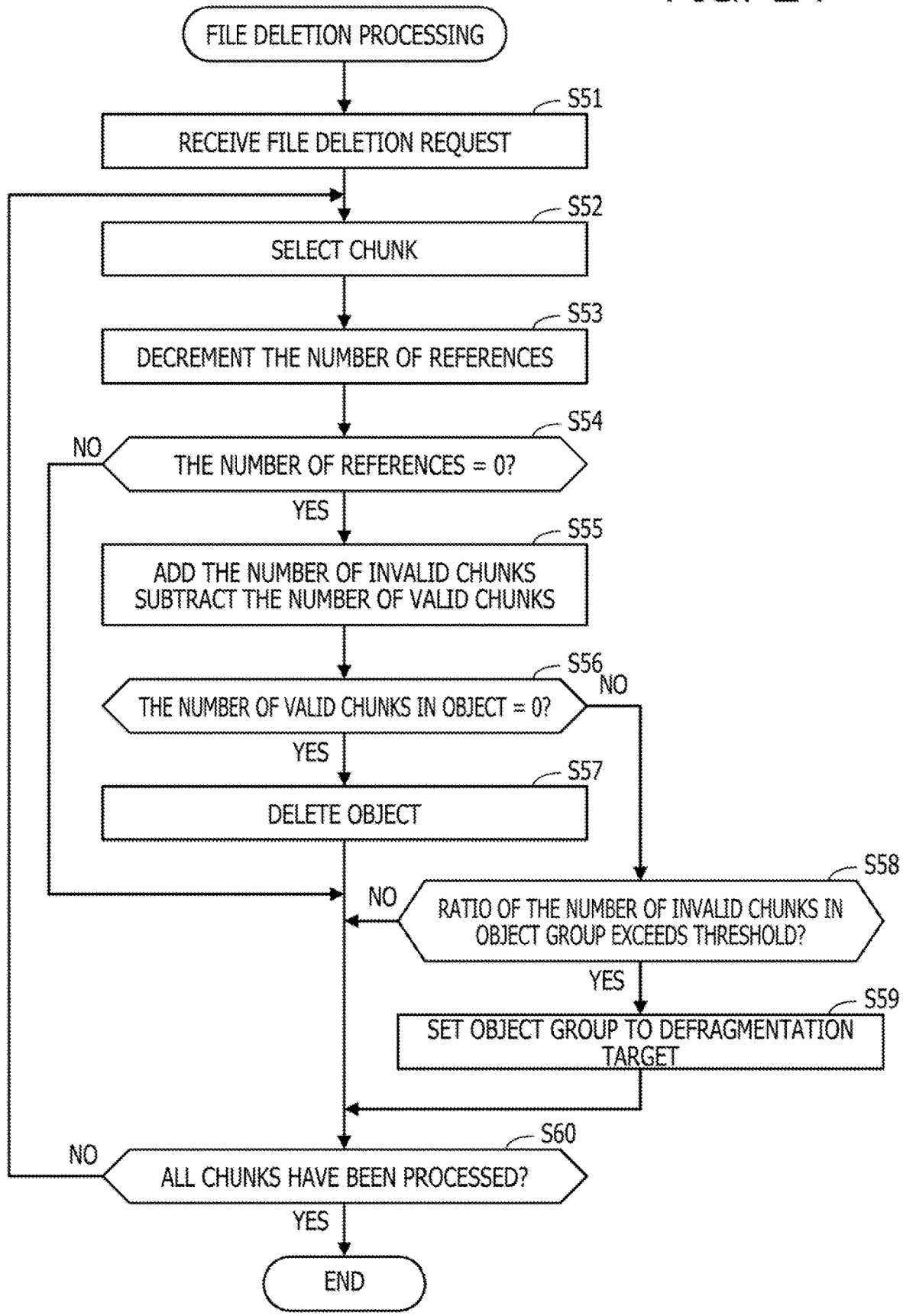
FIG. 21 is an example of a flowchart illustrating a procedure of file deletion processing.

FIG. 21 is an example of a flowchart illustrating a procedure of file deletion processing.

[Step S51] The file input/output unit 120 receives a file deletion request from the NAS client 210. The chunk management unit 132 of the deduplication processing unit 130 identifies the file number of a file for which the delete request is made by using the directory table 111.

[Step S52] The chunk management unit 132 identifies the record in which the file number identified in step S51 is registered from the chunk map table 112, and selects one identified record. In this manner, one chunk generated from the file for which the delete request is made is selected.

[Step S53] The chunk management unit 132 acquires the chunk number from the record selected in Step S52. The chunk management unit 132 decrements the number of references associated with the acquired chunk number by "1" in the chunk management table 113.

[Step S54] The chunk management unit 132 determines whether or not the decremented number of references is "0". The duplication determination unit 131 moves the processing to Step S55 when the number of references is "0", and moves processing to Step S60 when the number of references is not "0" ("1" or more).

[Step S55] In this case, the chunk selected in Step S52 is invalid. The chunk management unit 132 identifies the object number associated with the chunk number acquired in Step S53, from the chunk management table 113. The chunk management unit 132 refers to the object management table 115, adds "1" to the number of invalid chunks associated with the identified object number, and subtracts "1" from the number of valid chunks associated with the concerned object number.

[Step S56] The chunk management unit 132 determines whether or not the number of valid chunks registered in the concerned record in the object management table 115 has become "0" as a result of the subtraction from the number of valid chunks in Step S55. The chunk management unit 132 moves the processing to Step S57 when the number of valid chunks is "0", and moves the processing to Step S58 when the number of valid chunks is not "0" ("1" or more).

[Step S57] In this case, all chunks in the object to which the chunk selected in Step S52 are invalid. For this reason, this object is unnecessary. Thus, the chunk management unit 132 requests the cloud communication unit 140 to delete this object. The cloud communication unit 140 requests the cloud storage 240 to delete the object according to the DELETE command. Thus, the object is deleted from the cloud storage 240.

The chunk management unit 132 specifies the search table in which the hash key based on each chunk in the deleted object is registered. The chunk management unit 132 deletes the hash key based on each chunk in the deleted object from the specified search table. From the search table, the record containing the concerned hash key is deleted.

[Step S58] The chunk management unit 132 specifies the search table in which the chunk number of the chunk selected in step S52 is registered. From the chunk numbers registered in the specified search table, the chunk management unit 132 specifies all the objects to which the chunks corresponding to these chunk numbers belong. In this way, an object group that contains the objects in which invalid chunks have occurred and is associated with the same search table is specified.

The chunk management unit 132 refers to the object management table 115 and calculates the ratio of the number of invalid chunks to the number of all the chunks (the sum of the number of valid chunks and the number of invalid chunks) contained in the specified object group. The chunk management unit 132 moves the processing to step S59 in the case where the ratio of the number of invalid chunks exceeds a predetermined threshold, and moves the processing to step S60 in the case where the ratio is less than or equal to the threshold.

[Step S59] In the case where the ratio of the number of invalid chunks exceeds the threshold in step S58, it is determined that the data deletion effect by the defragmentation is high in the object group to which the chunk selected in step S52 belongs. In this case, the chunk management unit 132 sets this object group to a defragmentation target.

Although in the present embodiment, as illustrated in steps S58 and S59, the desirability of defragmentation is determined with an object group corresponding to one search table being used as a unit, the unit for determining the desirability of defragmentation is not limited to this example. For example, the desirability of defragmentation may be determined based on units of object. In this case, when the determination is "No" in step S56, the concerned object is set as the defragmentation target. For example, the desirability of defragmentation may be determined with a set of chunks whose chunk keys match the same classification condition as the classification condition which the chunk key based on the chunk selected in step S52 matches being as a unit among chunks contained in the object group corresponding to the search table.

[Step S60] The chunk management unit 132 determines whether or not chunks corresponding to all records identified in Step S52 (for example, all chunks generated from a file for which the delete request is made) have been processed. The chunk management unit 132 moves the processing to Step S52 when any unprocessed chunk is present, selects one unprocessed chunk and continues the processing. On the other hand, the chunk management unit 132 notifies the file input/output unit 120 of the completion of file deletion when all chunks have been processed. The notified file input/output unit 120 transmits response information indicating the completion of file deletion to the NAS client 210.

Figure 22:
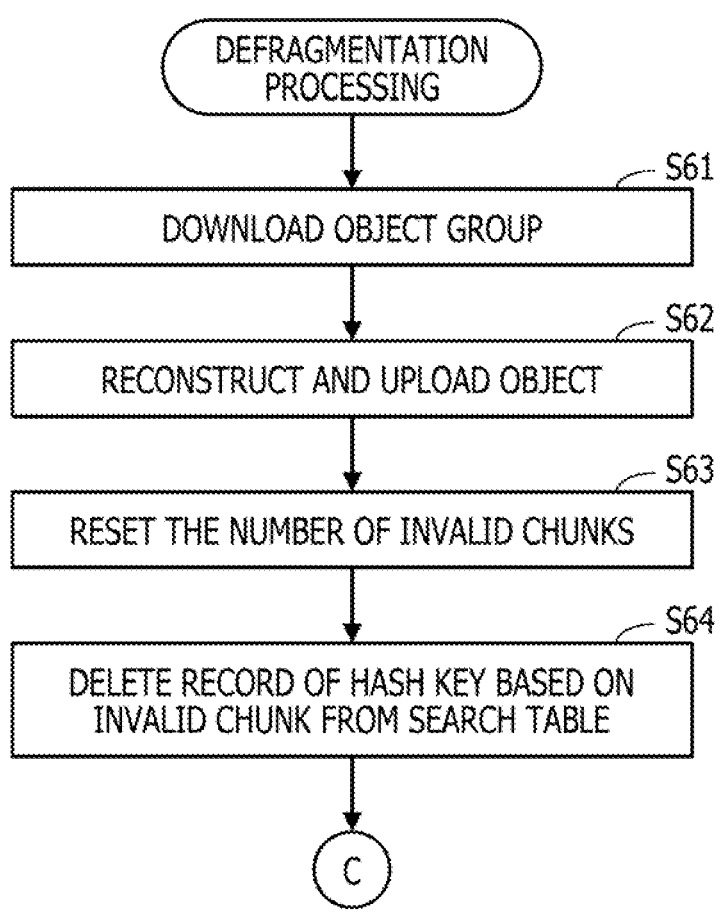
FIG. 22 is an example of a flowchart (1) illustrating a procedure of defragmentation processing.
Figure 23:
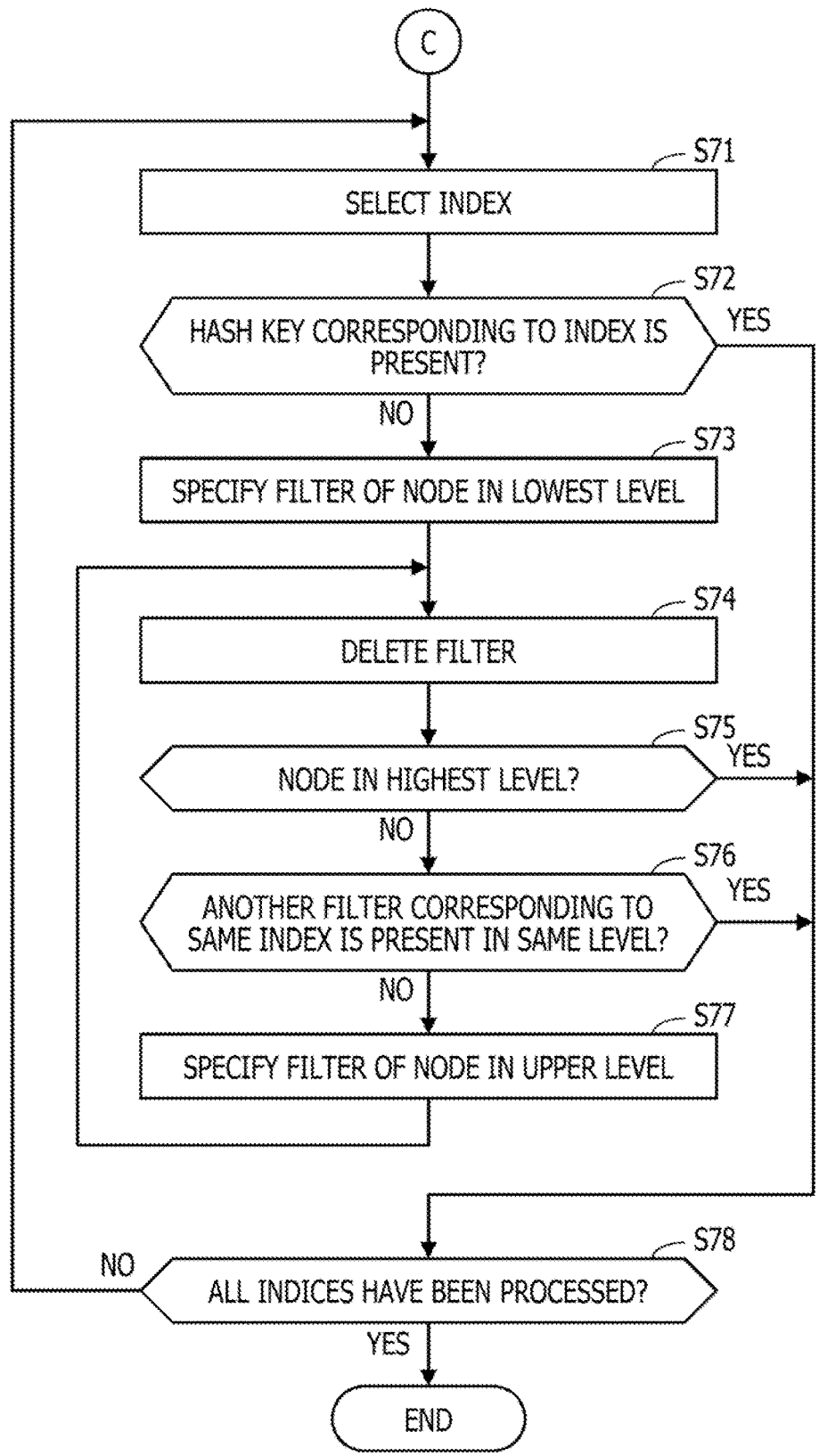
FIG. 23 is an example of a flowchart (2) illustrating the procedure of defragmentation processing.

FIGS. 22 and 23 are an example of flowcharts illustrating a procedure of the defragmentation processing.

[Step S61] The defragmentation processing unit 133 of the deduplication processing unit 130 selects one object group set to be the defragmentation target in step S59 in FIG. 21. The defragmentation processing unit 133 requests the cloud communication unit 140 to acquire all objects belonging to the selected object group. The cloud communication unit 140 downloads all of the concerned objects from the cloud storage 240 according to the GET command and passes the objects to the defragmentation processing unit 133.

In step S61, only an object having the ratio of the number of invalid chunks to all the chunks in the object exceeding a predetermined value among the objects contained in the object group may be downloaded.

[Step S62] The defragmentation processing unit 133, for each acquired object, combines only valid chunks contained in the object to reconstruct an object. The defragmentation processing unit 133 requests the cloud communication unit 140 to upload each reconstructed object. The cloud communication unit 140 uploads each object to the cloud storage 240 according to the PUT command. In fact, after the original object downloaded in Step S61 is deleted, the reconstructed object is uploaded.

[Step S63] The defragmentation processing unit 133 resets the number of invalid chunks registered in the record corresponding to each object acquired in Step S61 among the records in the object management table 115 to "o".

[Step S64] The defragmentation processing unit 133 selects the search table in which the hash key based on the chunk in each object acquired in step S61 is registered, as the processing target from this time. The defragmentation processing unit 133 deletes the record in which the hash key based on the invalid chunk (the hash key based on the chunk removed from the object in step S62) is registered from the specified search table.

The description continues below by using FIG. 23. In the processing illustrated in FIG. 23, bit reduction processing on the Bloom filter corresponding to the search table selected in step S64 is executed.

[Step S71] The defragmentation processing unit 133 selects one index.

[Step S72] The defragmentation processing unit 133 determines whether the hash key classified by the selected index is present in the search table to be the processing target. For example, in the case where the index "0x00" has been selected, the presence or absence of the hash key in which the start 1 byte is "0x00" is determined. The defragmentation processing unit 133 moves the processing to step S78 in the case where even one corresponding hash key is present, and moves the processing to step S73 in the case where there is no such hash key.

[Step S73] The defragmentation processing unit 133 selects a node associated with the search table to be the processing target among the nodes in the lowest level of the hierarchical Bloom filter 118. The defragmentation processing unit 133 specifies the Bloom filter corresponding to the index specified in step S71 from the bit array of the selected node.

[Step S74] The defragmentation processing unit 133 deletes the Bloom filter specified in step S73 or step S77 immediately before. Specifically, for example, the defragmentation processing unit 133 deletes the filter address of the corresponding Bloom filter from the filter management table 116a to release the storage area of the Bloom filter in the storage unit 110.

[Step S75] The defragmentation processing unit 133 determines whether the node to which the Bloom filter specified in step S73 or step S77 immediately before belongs is the node in the highest level of the hierarchical Bloom filter 118. The defragmentation processing unit 133 moves the processing to step S78 in the case where the node is the node in the highest level, and moves the processing to step S76 in the case where the node is not.

[Step S76] The defragmentation processing unit 133 selects the other nodes in the same level as the node to which the Bloom filter specified in step S73 or step S77 immediately before belongs. The defragmentation processing unit 133 determines whether the Bloom filter corresponding to the index specified in step S71 is present in the bit arrays of the selected other nodes. In this determination, in the case where an address is registered in the item of filter address corresponding to the corresponding Bloom filter in the filter management table 116a, it is determined that the Bloom filter is present. On the other hand, an address is not registered in this item (NULL is registered), it is determined that the Bloom filter is not present.

In the case where the Bloom filter is not present in the bit arrays of all the other nodes, the defragmentation processing unit 133 moves the processing to step S77. In this case, it is determined that the Bloom filter of the same index in the node in the level higher than these nodes may be deleted. On the other hand, in the case where the corresponding Bloom filter is present in the bit array of at least one of the other nodes, the defragmentation processing unit 133 determines that the Bloom filter in the node in the higher level is not allowed to be deleted, and moves the processing to step S78.

[Step S77] The defragmentation processing unit 133 selects a node in the level higher than the node in which the Bloom filter has been deleted in step S74. The defragmentation processing unit 133 specifies the Bloom filter corresponding to the index selected in step S71 from the bit array of the selected node in the higher level. Thereafter, the processing proceeds to step S74, and the specified Bloom filter is deleted.

[Step S78] The defragmentation processing unit 133 determines whether all the indices have been processed. The defragmentation processing unit 133 moves the processing to step S71 in the case where any unprocessed indices are present, and selects one of the unprocessed indices and continues the processing. Meanwhile, the defragmentation processing unit 133 ends the defragmentation processing in the case where all the indices have been processed.

Next, a modification in which part of the processing of the cloud storage gateway 100 according to the second embodiment is modified is described.

<First Modification>

In the above-described second embodiment, the storage location address in the storage unit 110 is managed for each Bloom filter in the bit array of each node by using the filter management table 116a illustrated in FIG. 11. For this reason, the deduplication processing unit 130 is allowed to access the Bloom filter corresponding to a desired index in a desired node by reading the filter address and the filter size from the filter management table 116a. However, as another method, it is possible to store the bit arrays of the respective nodes in continuous storage areas, and to access a desired Bloom filter in accordance with the amount of offset from the start address of the bit array. FIG. 24 illustrates a filter management table in this case below.

FIG. 24 is a diagram illustrating a configuration example of a filter management table in a first modification. The filter management table 116a1 illustrated in FIG. 24 is different from the filter management table 116a in FIG. 11 that the filter management table 116a1 holds the start address of a bit array in the item of filter address instead of holding the address of a Bloom filter of each index.

The filter management table 116a1 holds a bitmap in each record. The bitmap contains bits corresponding to each index, and the value of each bit indicates whether or not a Bloom filter corresponding to the index is present. As an example here, in the case where a Bloom filter is present, a bit value "1" is set, while in the case where a Bloom filter is not present (or deleted), a bit value "0" is set. Hence, in the initial state, each bit value of the bitmap is set to "1".

In the case where this filter management table 116a1 is used, the deduplication processing unit 130 is allowed to specify a record corresponding to a node, and to access a desired Bloom filter based on the filter address, the filter size, and the bitmap in the record. For example, in the case of accessing a Bloom filter of index "0x03" in the state where no Bloom filters in a bit array have been deleted, the deduplication processing unit 130 is allowed to specify, as the start address of the Bloom filter, the position of offset 3 times the filter size from the start address registered in the item of filter address.

In the case where a Bloom filter in the bit array is deleted in step S74 in FIG. 23, the remaining bit arrays are combined and re-stored in another storage area in the storage unit 110, and along with this, the filter addresses in the filter management table 116a1 are also updated. In the bitmap, the bit value corresponding to the index of the deleted Bloom filter is updated to "0".

For example, in the case of accessing the Bloom filter of index "0x03" in the state where the Bloom filter of index "0x01" in the bit array has been deleted, the deduplication processing unit 130 recognizes that the Bloom filter of index "0x1" has been deleted from the corresponding bitmap. The deduplication processing unit 130 is allowed to specify, as the start address of the Bloom filter, the position of offset 2 times the filter size from the start address registered in the item of filter address.

The bitmap may be used to determine whether a Bloom filter of the same index as that of the deleted Bloom filter is present in another bit array in the same level in step S76 in FIG. 23. Specifically, for example, in the case where the bit value corresponding to the index is "1" in the bitmap, it is determined that the Bloom filter is present, while in the case where the bit value is "0", it is determined that the Bloom filter is not present (has been deleted).

In the above-described first modification, it is possible to reduce the data size of management data (filter management table) for managing the storage position of each Bloom filter and enhance the use efficiency of the storage area of the storage unit 110 as compared with the second embodiment. On the other hand, since when a Bloom filter is deleted, the remaining bit arrays are collected and re-stored in another storage area, the processing load at the time of deleting a Bloom filter is higher than that in the second embodiment.

<Second Modification>

The configuration of the hierarchical Bloom filter 118 may be modified as in FIG. 25 described below.

Figure 25:
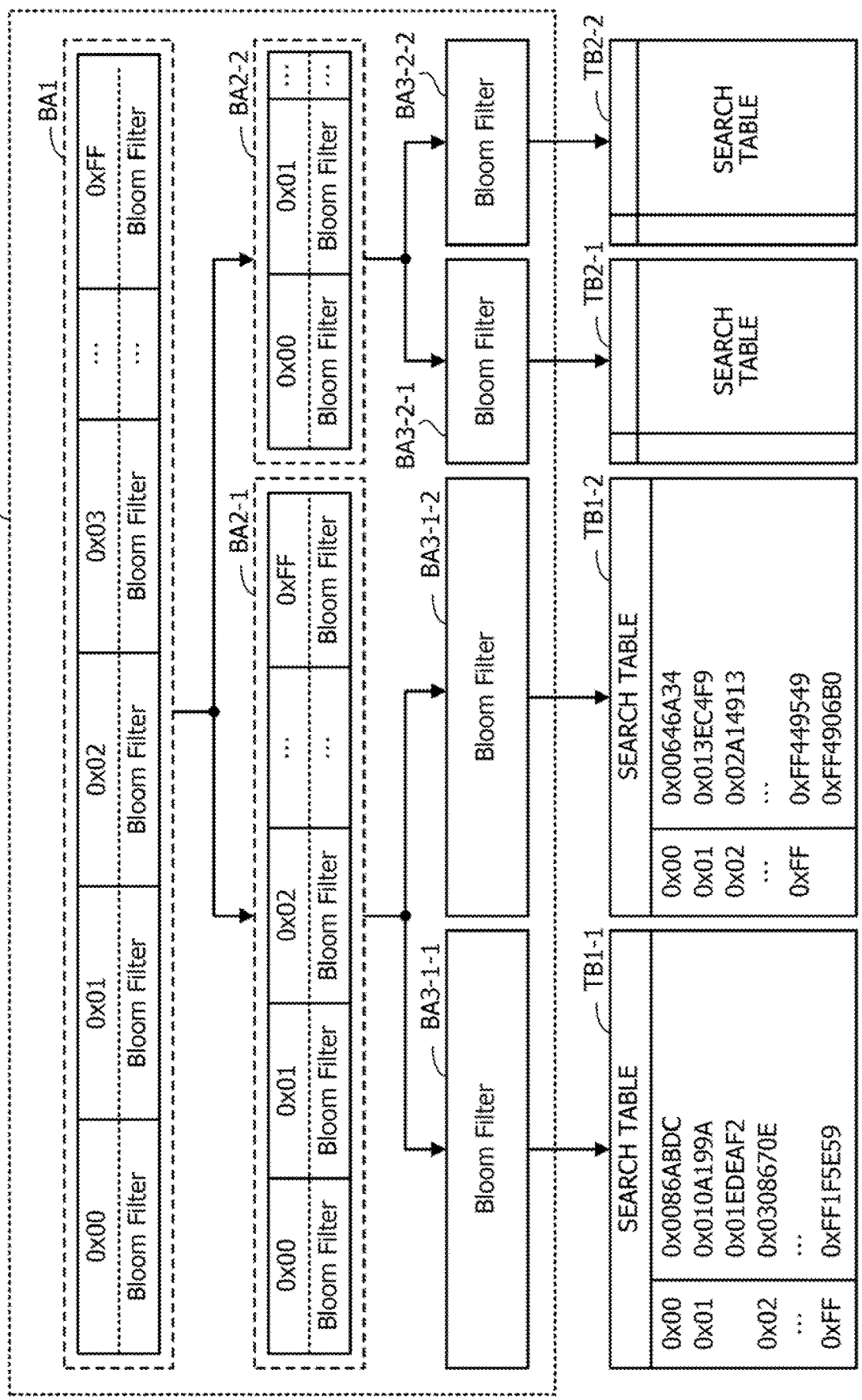
FIG. 25 is a diagram illustrating an internal configuration example of a hierarchical Bloom filter in a second modification.

FIG. 25 is a diagram illustrating an internal configuration example of a hierarchical Bloom filter in the second modification. The hierarchical Bloom filter 118a illustrated in FIG. 25 has a configuration different from that of the hierarchical Bloom filter 118 illustrated in FIG. 10 in that bit arrays BA3-1-1, BA3-1-2, BA3-2-1, and BA3-2-2 of nodes in the lowest level are each used integrated Bloom filters.

In the configuration of FIG. 25, each bit value of the bit arrays of the node in the lowest level is set by using all hash keys registered in the corresponding search table. For example, the bit values of the bit array BA3-1-1 are set by conducting calculations using k types of hash functions and all the hash keys registered in the search table TB1-1. On the other hand, the bit arrays of nodes in the second level and higher are each used as Bloom filters divided for indices as in the case of the second embodiment.

In the configuration of FIG. 25, in the case where a hash key has been deleted from a certain search table, a Bloom filter of the corresponding node in the lowest level is regenerated. For example, in the case where a certain number of hash keys have been deleted from the search table TB1-1, the number of bits is reduced from the corresponding bit array BA3-1-1 in accordance with the number of deleted hash keys, and all the bit values are reset to "0". The setting of bit values for the bit array BA3-1-1 after the reduction of the number of bits is conducted again by using all the hash keys remaining in the search table TB1-1.

However, in this method, when it is determined whether Bloom filters may be reduced for the second node from the lowest level, the deduplication processing unit 130 is not allowed to check whether the Bloom filter is present in each node in the lowest level. In view of this, in the second modification, the bitmap illustrated in FIG. 24 is registered in at least the record corresponding to each node in the lowest level among the records in the filter management table. In the case where all the hash keys corresponding to a certain index in the search table corresponding to one of the nodes in the lowest level, the deduplication processing unit 130 updates the values of bits corresponding to the index to "0" among the bits in the bitmap corresponding to the node. In this way, the deduplication processing unit 130 is allowed to determine whether the Bloom filter of the above-described index in another bit array in the lowest level based on the bitmap in step S76 in FIG. 23.

In the second embodiment, the rate of reduction of the number of bits for bit arrays of the nodes in the lowest level changes depending on the number of indices and the number of hash keys for the same index to be stored in the search table. On the other hand, in the second modification, the number of bits for the bit arrays of the nodes in the lowest level may be reduced in accordance with a reduction in the number of hash keys in the search table regardless of the indices. For this reason, according to the second modification, the possibility of improving the space efficiency of Bloom filters is increased as compared with the second embodiment.

The processing functions of the apparatuses (for example, the data processing apparatus 10 and the cloud storage gateway 100) illustrated in the above embodiments may be implemented by a computer. In such a case, there is provided a program describing processing contents of functions to be included in each apparatus, and the computer executes the program to implement the aforementioned processing functions in the computer. The program describing the processing contents may be recorded on a computer-readable recording medium. The computer-readable recording medium includes a magnetic storage device, an optical disc, a magneto-optical recording medium, a semiconductor memory, and the like. The magnetic storage device includes a hard disk drive (HDD), a magnetic tape, and the like. The optical disc includes a compact disc (CD), a digital versatile disc (DVD), a Blu-ray disc (BD, registered trademark), and the like. The magneto-optical recording medium includes a magneto-optical (MO) disk and the like.

In order to distribute the program, for example, portable recording media, such as DVDs and CDs, on which the program is recorded are sold. The program may also be stored in a storage device of a server computer and be transferred from the server computer to other computers via a network.

The computer that executes the program, for example, stores the program recorded on the portable recording medium or the program transferred from the server computer in its own storage device. The computer then reads the program from its own storage device and performs processing according to the program. The computer may also directly read the program from the portable recording medium and perform processing according to the program. The computer may also sequentially perform processes according to the received program each time the program is transferred from the server computer coupled to the computer via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing apparatus, comprising:
a memory configured to store a first bit array including a first Bloom filter and a second Bloom filter, the first Bloom filter associated with a first data subset containing a data element that matches a first classification condition among data elements contained in a first data set, the second Bloom filter associated with a second data subset containing a data element that matches a second classification condition among the data elements contained in the first data set, the first classification condition being different from the second classification condition; and
a processor coupled to the memory and configured to:
when a first data element to be a search target is inputted, determine whether the same data element as the first data element is present in the first data subset by using the first Bloom filter in a case where the first data element matches the first classification condition,
determine whether the same data element as the first data element is present in the second data subset by using the second Bloom filter in a case where the first data element matches the second classification condition,
when all the data elements contained in the first data subset are deleted, delete the first Bloom filter from the first bit array,
when all data elements are deleted in the first data subset contained in the first data set associated with one bit array of the plurality of first bit arrays, delete the first Bloom filter from the one bit array,
determine whether the first Bloom filters have been deleted in all the other bit arrays other than the one bit array among the plurality of first bit arrays,
when the first Bloom filters have been deleted in all the other bit arrays, delete the third Bloom filter from the second bit array, and
when the first data element is inputted and the first data element matches the first classification condition, determine that the first data element is not present in the first data set in a case where the first Bloom filter has been deleted,
the memory stores a plurality of the first bit arrays and stores a second bit array containing a third Bloom filter and a fourth Bloom filter,
the plurality of first bit arrays are associated with individual ones of the first data set,
the first Bloom filter contained in each of the plurality of first bit arrays is used to determine whether a data element to be a search target is contained in the first data subset contained in the corresponding first data set,
the second Bloom filter contained in each of the plurality of first bit arrays is used to determine whether the data element to be the search target is contained in the second data subset contained in the corresponding first data set,
the third Bloom filter is used to determine whether the data element to be the search target is contained in the first data subset contained in the first data set associated with each of the plurality of first bit arrays, and
the fourth Bloom filter is used to determine whether the data element to be the search target is contained in the second data subset contained in the first data set associated with each of the plurality of first bit arrays.

2. The data processing apparatus according to claim 1, wherein the processor is further configured to:
when the first data element is inputted, determine whether the same data element as the first data element is present in the first data subset contained in the first data set associated with each of the plurality of first bit arrays by using the third Bloom filter in a case where the first data element matches the first classification condition, and
when the same data element is determined to be present, determine in which of the first data sets associated with each of the plurality of first bit arrays has the same data element as the first data element by using the first Bloom filter contained in each of the plurality of first bit arrays.

3. The data processing apparatus according to claim 1, wherein the first classification condition and the second classification condition are conditions based on a value or attribute of a data element.

4. The data processing apparatus according to claim 1, wherein
the first classification condition indicates that a bit value at a specific position in a data element is a first value, and
the second classification condition indicates the bit value is a second value.

5. A non-transitory computer-readable storage medium storing a program that causes a processor included in a data processing apparatus to execute a process, the process comprising:
when a first data element to be a search target is inputted, executing determination processing by referring to a memory that stores a first bit array containing a first Bloom filter associated with a first data subset containing a data element that matches a first classification condition among data elements contained in a first data set and a second Bloom filter associated with a second data subset containing a data element that matches a second classification condition among the data elements contained in the first data set, the first classification condition being different from the second classification condition, the determination processing including determining whether the same data element as the first data element is present in the first data subset by using the first Bloom filter in a case where the first data element matches the first classification condition and determining whether the same data element as the first data element is present in the second data subset by using the second Bloom filter in a case where the first data element matches the second classification condition; and when all the data elements contained in the first data subset are deleted, deleting the first Bloom filter from the first bit array, the deleting includes:
when all data elements are deleted in the first data subset contained in the first data set associated with one bit array of the plurality of first bit arrays, deleting the first Bloom filter from the one bit array, and
determining whether the first Bloom filters have been deleted in all the other bit arrays other than the one bit array among the plurality of first bit arrays, and
when the first Bloom filters have been deleted in all the other bit arrays, deleting the third Bloom filter from the second bit array, and in the determination processing, when the first data element is inputted and the first data element matches the first classification condition, the first data element is determined to be not present in the first data set in a case where the first Bloom filter has been deleted,
the memory stores a plurality of the first bit arrays and stores a second bit array containing a third Bloom filter and a fourth Bloom filter,
the plurality of first bit arrays are associated with individual ones of the first data set,
the first Bloom filter contained in each of the plurality of first bit arrays is used to determine whether a data element to be a search target is contained in the first data subset contained in the corresponding first data set,
the second Bloom filter contained in each of the plurality of first bit arrays is used to determine whether the data element to be the search target is contained in the second data subset contained in the corresponding first data set,
the third Bloom filter is used to determine whether the data element to be the search target is contained in the first data subset contained in the first data set associated with each of the plurality of first bit arrays,
the fourth Bloom filter is used to determine whether the data element to be the search target is contained in the second data subset contained in the first data set associated with each of the plurality of first bit arrays.

6. The non-transitory computer-readable storage medium according to claim 5, wherein the determination processing includes:
when the first data element is inputted, determining whether the same data element as the first data element is present in the first data subset contained in the first data set associated with each of the plurality of first bit arrays by using the third Bloom filter in a case where the first data element matches the first classification condition, and
when the same data element is determined to be present, determining which of the first data sets associated with each of the plurality of first bit arrays has the same data element as the first data element by using the first Bloom filter contained in each of the plurality of first bit arrays.

7. The non-transitory computer-readable storage medium according to claim 5, wherein the first classification condition and the second classification condition are conditions based on a value or attribute of a data element.

8. The non-transitory computer-readable storage medium according to claim 5, wherein
the first classification condition indicates that a bit value at a specific position in a data element is a first value, and
the second classification condition indicates the bit value is a second value.

9. A data processing method, comprising:
storing a first bit array including a first bloom filter and a second bloom filter, the first Bloom filter associating with a first data subset containing a data element that matches a first classification condition among data elements contained in a first data set, the second Bloom filter associating with a second data subset containing a data element that matches a second classification condition among the data elements contained in the first data set, the first classification condition being different from the second classification condition;
receiving a first data element to be a search target;
determining whether the same data element as the first data element is present in the first data subset by using the first Bloom filter in a case where the first data element matches the first classification condition;
determining whether the same data element as the first data element is present in the second data subset by using the second Bloom filter in a case where the first data element matches the second classification condition; and
when all the data elements contained in the first data subset are deleted, deleting the first Bloom filter from the first bit array, the deleting includes:
when all data elements are deleted in the first data subset contained in the first data set associated with one bit array of the plurality of first bit arrays, deleting the first Bloom filter from the one bit array, and
determining whether the first Bloom filters have been deleted in all the other bit arrays other than the one bit array among the plurality of first bit arrays, and
when the first Bloom filters have been deleted in all the other bit arrays, deleting the third Bloom filter from the second bit array, and
in the determining, when the first data element is received and the first data element matches the first classification condition, the first data element is determined to be not present in the first data set in a case where the first Bloom filter has been deleted,
the storing includes storing a plurality of first bit arrays including the first bit arrays and stores a second bit array containing a third Bloom filter and a fourth Bloom filter,
the plurality of first bit arrays are associated with individual ones of the first data set,
the first Bloom filter contained in each of the plurality of first bit arrays is used to determine whether a data element to be a search target is contained in the first data subset contained in the corresponding first data set,
the second Bloom filter contained in each of the plurality of first bit arrays is used to determine whether the data element to be the search target is contained in the second data subset contained in the corresponding first data set,
the third Bloom filter is used to determine whether the data element to be the search target is contained in the first data subset contained in the first data set associated with each of the plurality of first bit arrays,
the fourth Bloom filter is used to determine whether the data element to be the search target is contained in the second data subset contained in the first data set associated with each of the plurality of first bit arrays.

* * * * *